US006459475B1

(12) United States Patent
Fukui

(10) Patent No.: US 6,459,475 B1
(45) Date of Patent: Oct. 1, 2002

(54) FIXING STRUCTURE

(75) Inventor: Takashi Fukui, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/697,643

(22) Filed: Oct. 27, 2000

(30) Foreign Application Priority Data

Oct. 27, 1999 (JP) ........................................... 11-304980
Oct. 27, 1999 (JP) ........................................... 11-304981

(51) Int. Cl.[7] ........................ G03B 27/10; G03B 27/32; G01D 15/24; B41J 11/00; G03G 15/01

(52) U.S. Cl. ........................... 355/110; 355/27; 355/28; 355/405; 346/138; 347/220; 399/304

(58) Field of Search ............................ 355/27, 28, 405, 355/110; 347/220; 346/138; 399/304

(56) References Cited

U.S. PATENT DOCUMENTS 4,918,466 A * 4/1990 Takahashi et al. .......... 346/108
4,999,649 A * 3/1991 Saji et al. .................... 346/134
5,732,632 A * 3/1998 Oomoto et al. ............. 101/483
5,894,319 A * 4/1999 Okamura et al. ........... 347/264

FOREIGN PATENT DOCUMENTS

DE A1 43 15 905 3/1994 ........... B41F/27/12
EP A2 0 112 518 7/1984 ........... B41B/15/02

* cited by examiner

*Primary Examiner*—Russell Adams
*Assistant Examiner*—Khaled Brown
(74) *Attorney, Agent, or Firm*—Sughrue Mion, PLLC

(57) ABSTRACT

A chuck for detachably fixing an object to a rotatable base, the chuck comprising (a) a support detachably mountable to the base, (b) a clamp having opposite ends, the clamp being pivotally mounted to the support between the ends of the clamp, and (c) a resilient member connected to one end of the clamp, the resilient member being resiliently deformed when the support is mounted to the base, which applies a force to the one end of the clamp, thereby causing the other end of the clamp to pivot downward, and apply a pressing force against an object disposed between the base and the other end of the clamp, wherein when the base rotates, centrifugal force acts on the clamp and increases the pressing force against the object.

21 Claims, 19 Drawing Sheets

E
P1
54
90
92
94
96
160
162
176
178

PRIOR ART

FIXING STRUCTURE

BACKGROUND OF THE INVENTION

1. Field of the Invention

The present invention relates to a fixing structure for detachably fixing an object to a base such as a rotational drum or the like.

2. Description of the Related Art

A photosensitive member, (referred to as a print plate hereinafter) which is formed such that a photosensitive layer is formed on a thin, sheet-shaped support which is made of aluminum, is used for printing. An image is recorded on the print plate in an exposure step and the exposed print plate is developed in a development step. Then, the resultant print plate is used as a machine plate for printing. A longitudinal dimension and a horizontal dimension of the print plate (machine plate) are different depending on sizes of printed matters.

As an image exposure device for a print plate, a device is known in which a print plate is wrapped around a rotational drum so as to be integrally held, the rotating drum is rotated at a high speed and a light beam in accordance with image data is irradiated onto the print plate, thus the print plate is scanned and exposed.

In this type of the image exposure device, as a structure for fixing a print plate to a rotating drum, a structure is known which clamps and fixes non-image portions of both ends of a print plate along the circumferential direction of the rotating drum with respect to an outer circumferential surface of the rotating drum. In the fixing structure, a clamp portion is urged to the rotating drum side by an urging force of an urging means, and the print plate is clamped and fixed between the clamp portion and the outer surface of the rotating drum.

However, in a case of this fixing structure, there is a structural drawback that when the rotating drum is rotated at a high speed, a centrifugal force acts on the clamp portion in a direction opposite a direction of clamping and fixing, thus a force of clamping and fixing is inevitably decreased. Further, there is a drawback that the print plate itself comes up off the drum due to an action of the centrifugal force so that deviation of print plates may be generated. These drawbacks cause image recording failures such as offset of positions of images, light beams being out of focus and torsion of images recorded on the print plate, and the like. As a result, the finish of printed matters may be poor.

Next, a description will be given of a chuck-type fixing structure which is similar to the above-described clamp-type fixing structure. The chuck-type fixing structure has a chuck. The chuck presses and fixes side edge portions of a print plate along the circumferential direction of a rotating drum to the outer surface of the rotating drum. A plurality of grooves, whose cross-sections are formed in an up-side-down T-shaped configuration and which extend in the circumferential direction of the rotating drum, are formed in parallel at the outer surface of the rotating drum so as to correspond to print plates of various sizes. It is structured such that a base portion of the chuck (so-called fixing piece) is mounted to one of the grooves and the chuck can be moved along (and fixed to) the groove.

FIG. 19 shows a relationship between the chuck of the above-described fixing structure and the groove. In FIG. 19, a groove 212 formed at a rotating drum 210 includes a narrow width portion at an entrance side and an enlarged width portion 214 whose cross-section is formed in a rectangular configuration at an inner side (center of drum side).

A chuck includes a thin and round bar-shaped supporting shaft 218, a base portion 216, i.e., a fixing piece 216 which is formed in a substantially rectangular shape such that longitudinal direction end portions are round. The longitudinal dimension of the fixing piece 216 is substantially the same as the width dimension of the enlarged width portion 214 of the groove 212, and a length of the fixing piece 216 perpendicular to the longitudinal direction thereof is shorter than the width dimension of the narrow width portion of the groove 212.

When the chuck is mounted and fixed to the drum, firstly, the fixing piece 216 of the chuck is inserted into the enlarged width portion 214 through the narrow width portion of the groove 212. Then, the supporting shaft 218 is rotated about 90° about its axis. At this time, the fixing piece 216 is also rotated about 90° within the groove 212 (the enlarged width portion 214 of the groove 212). Therefore, the fixing piece 216 cannot be removed from the enlarged width portion 214 of the groove 212. That is, the chuck (the fixing piece 216) is fixed to a rotating drum 210.

The following drawbacks arise in the above-described fixing structure. That is, when the rotating drum 210 is rotated at a high speed in order to carry out exposure, a centrifugal force acts on the chuck (the fixing piece 216), and a force to bend the peripheral edge of the opening portion of the groove 212 is applied thereto. As the thickness of the peripheral edge of the opening portion is thin, the peripheral edge of the opening portion deforms upwards and the fixing piece 216 is removed from the groove. Further, if the peripheral edge of the opening portion is deformed, there may be an undesirable case in which adhering of the print plate to the outer circumferential surface of the rotating drum may be poor.

In order to avoid damage of the peripheral edge of the opening portion of the groove, the peripheral edge of the opening portion needs to be made thicker, however, in order to make the peripheral edge of the opening portion thicker, the thickness of the rotating drum needs to be thick. As a result, the weight of the rotating drum is inevitably increased.

SUMMARY OF THE INVENTION

The present invention provides a fixing structure which can solve the above-described drawbacks. Further, the present invention provides a fixing structure which can detachably fix an object to a base such as a rotating drum or the like without using a complicated mechanism. The present invention provides a fixing structure which, when a sheet material such as a print plate or the like (fixing member) is wrapped around the base, the sheet material can be securely fixed to the base.

An aspect of the present invention is a chuck for detachably fixing an object to a rotatable base, the chuck comprising, (a) a support detachably mountable to the base, (b) a clamp having opposite ends, the clamp being pivotally mounted to the support between the ends of the clamp, and (c) a resilient member connected to one end of the clamp, the resilient member being resiliently deformed when the support is mounted to the base, which applies a force to the one end of the clamp, thereby causing the other end of the clamp to pivot downward, and apply a pressing force against an object disposed between the base and the the other end of the clamp, wherein when the base rotates, centrifugal force acts on the clamp and increases the pressing force against the object.

Another aspect of the present invention is a fixing structure for detachable mounting, comprising, a base having a dovetail groove-type groove including a bottom and a top, formed along the base and whose cross-section is a substantially trapezoidal such that the groove has a width less than a width of the groove top, and an object having an end with a block integrally provided at the end of the object and the block being insertable into the groove, wherein the object is rotatable with the block about an axis of the object, and the block is structured such that when the object is positioned at a first rotation angle position around the axis of the object, the block can be inserted into the groove and when the block is rotated from the first rotation angle position to a second rotation angle position, the block engages with the groove and thus further rotation of the block is prevented and the block cannot be removed from the groove at the second rotation angle position.

BRIEF DESCRIPTION OF THE DRAWINGS

FIG. 17A shows a state in which the fixing piece is inserted into the mounting groove.

FIG. 17B shows a state in which the fixing piece inserted into the mounting groove is in the process of being rotated.

FIG. 17C shows a state in which the fixing piece is mounted to the mounting groove.

FIG. 17D is a cross-sectional view, along the axis of the rotating drum, of a main portion of the mounting groove of FIG. 17A.

FIG. 17E is a cross-sectional view, along the axis of the rotating drum, of a main portion of the mounting groove of FIG. 17B.

FIG. 17F is a cross-sectional view, along the axis of the rotating drum, of a main portion of the mounting groove of FIG. 17C.

DESCRIPTION OF THE PREFERRED EMBODIMENTS

Embodiments of the present invention will be described with reference to the drawings.

Figure 1:
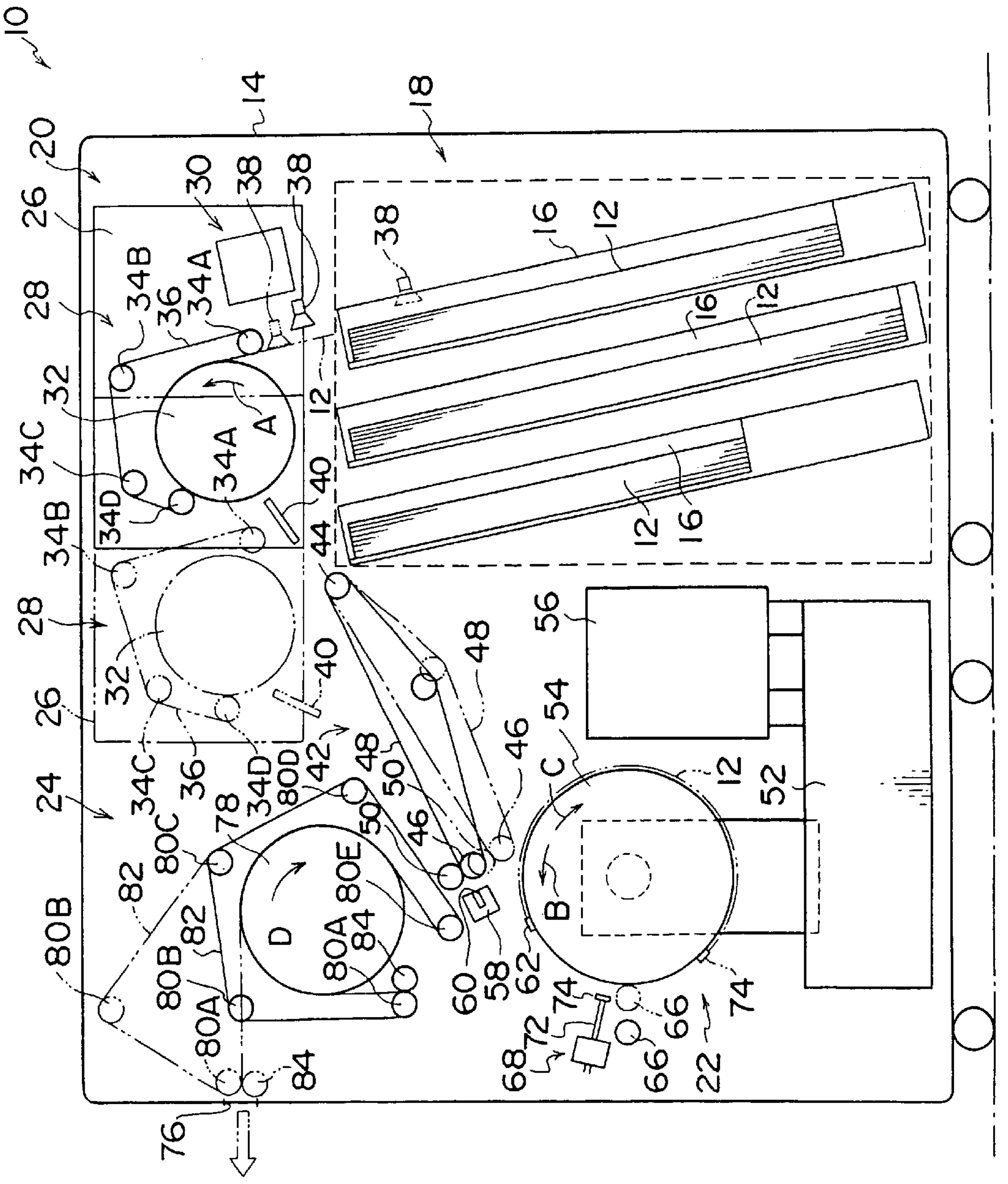
FIG. 1 is a schematic structural view of a first embodiment of an image exposure device relating to the present invention.

FIG. 1 shows a schematic structure of a first embodiment of an image exposure device relating to the present invention. In the image exposure device 10, a photosensitive lithographic print plate, (which will be referred to as a "print plate 12" hereinafter) in which a photosensitive layer is formed on a thin rectangular plate-shaped support (for example, a thickness thereof is about 0.3 mm) formed of, for example, aluminum or the like, is used as a sheet, and a light beam which is modulated on the basis of image data is irradiated onto the print plate 12 so as to carry out scanning-and-exposing. The print plate 12 subjected to image exposure in the image exposure device 10 is subjected to development processings or the like by an automatic developing apparatus (not shown) or the like.

The image exposure device 10 is structured such that a cassette loading section 18, a feed plate conveying section 20, a recording section 22 and a discharge buffer section 24 and the like are disposed within a machine frame 14. The cassette loading section 18 is disposed (at a lower right side in FIG. 1) within the machine frame 14, and a plurality of cassettes 16 each of which accommodates a large number of print plates 12 are loaded while inclined at a predetermined angle.

In the image exposure device 10, various sizes of print plates 12 whose longitudinal dimensions and lateral dimensions are different can be processed. The print plate 12 having any one of the various sizes is accommodated within the cassette 16 such that a photosensitive layer of the print plate 12 faces upwards and the print plate 12 is positioned such that one end thereof is at a predetermined position. A plurality of cassettes 16 is loaded into the cassette loading section 18 with a predetermined interval between each other such that respective ends of print plates 12 accommodated within the cassettes 16 are at the substantially same height.

The feed plate conveying section 20 is disposed above the cassette loading section 18. The recording section 22 is disposed at a lower central portion of the device so as to be adjacent to the cassette loading portion 18. The feed plate conveying section 20 is provided with a pair of side plates 26 (only one side plate is shown in FIG. 1) to which an inverting unit 28 and a sheet unit 30 are mounted.

The inverting unit 28 includes an inverting roller 32 having a predetermined outer diameter. A plurality of small rollers (in the first embodiment, for example, four small rollers 34A, 34B, 34C and 34D) are provided around the inverting roller 32. The small rollers 34A, 34B, 34C and 34D are disposed from the cassette loading section 18 side to the recording section 22 side via the top of the inverting roller 32. An endless conveying belt 36 is passed across the small rollers. Thus, the conveying belt 36 is entrained about the inverting roller 32 over about half the circumference thereof, by being extended between the small roller 34A and the small roller 34D.

The sheet unit 30 has a plurality of suckers 38 which suction an upper end portion of the print plate 12 within the cassette 16. The suckers 38 move downwards so as to oppose an upper end portion of the print plate 12 within the cassette 16 loaded into the cassette loading section 18 and suction the print plate 12. In the sheet unit 30, the suckers 38 which suction the print plate 12 are moved substantially upward such that the print plate 12 is drawn from the cassette 16, and a distal end of the drawn print plate 12 is inserted between the inverting roller 32 and the conveying belt 36. In FIG. 1, an outline of the movement positions of the suckers 38 are shown by two-dot chain lines.

In the inverting unit 28, the inverting roller 32 and the conveying belt 36 are rotated in a direction in which the print plate 12 is drawn from the cassette 16 (a direction shown by the arrow A in FIG. 1). Thus, the print plate 12 is nipped between the inverting roller 32 and the conveying belt 36 and drawn from the cassette 16. At the same time, the print plate 12 is entrained about the circumferential surface of the inverting roller 32 so as to be conveyed in a curved manner and to be inverted. A radius of the inverting roller 32 is such that when the print plate 12 is curved, the print plate 12 is not folded or bent (for example, at least 100 mm).

As shown by solid lines and two-dot chain lines in FIG. 1, the side plate 26 is moved horizontally in accordance with the position of the cassette 16 from which the print plate 12 is taken. Thus, the suckers 38 of the sheet unit 30 face the print plate 12 within the selected cassette 16.

The side plate 26 is provided with a guide 40 which is below the small roller 34D. The print plate 12 which is inverted by the inverting roller 32 is, at the small roller 34D side, fed from between the inverting drum 32 and the conveying belt 36 toward the guide 40. A conveyer 42 is disposed above the recording section 22. The print plate 12 fed from the inverting unit 28 is guided to the conveyer 42 by the guide 40.

The guide 40 is swung in accordance with the movement of the side plates 26 such that a direction in which the print plate 12 is guided is always directed to the conveyer 42. The small roller 34D at the recording section 22 side is moved so as to change a direction in which the print plate 12 is fed from the inverting unit 28 in accordance with the movement of the side plates 26. The small roller 34C is moved so as to apply substantially constant tension to the conveying belt 36 when the small roller 34D is moved. Accordingly, the print plate 12 fed from the inverting unit 28 is moderately curved by the guide 40 and is guided to the conveyer 42.

In the conveyer 42, a conveying belt 48 is entrained between a roller 44 at the feed plate conveying section 20 side and a roller 46 at the recording section 22 side, and the conveying belt 48 is inclined such that the recording section side thereof is directed downwards. The conveyer 42 is provided with a roller 50 so as to oppose the roller 46. The print plate 12 which is fed on the conveyer 42 is conveyed on the conveying belt 48 and is nipped by the rollers 46 and 50.

In the recording section 22, a rotating drum 54 and a recording head portion 56 are mounted to a stand 52. A puncher 58 is disposed above the rotating drum 54. In the conveyer 42, the print plate 12 is nipped by the rollers 46 and 50, and the distal end of the print plate 12 is inserted into a holding opening of a gripper 60 and held. When the distal end of the print plate 12 is inserted into the holding opening of a gripper 60, the puncher 58 punches a cutout for positioning at a predetermined position of the distal end of the print plate 12.

When the cutout is punched on the print plate 12, the conveyer 42, together with the conveying belt 48, drives the rollers 46 and 50 in reverse such that the distal end of the print plate 12 is drawn from the holding opening of a gripper 60 of the puncher 58. Further, the conveyer 42 is provided with a swinging means (not shown). The roller 46 side of the conveyer 42 is moved downward by the swinging means with the roller 44 side thereof being an axis, so as to approach the rotating drum 54 of the recording section 22. Thus, the end of the print plate 12 on the conveying belt 48 is directed to a predetermined position on the outer circumferential surface of the rotating drum 54, and the print plate 12 is conveyed on the conveying belt 48 toward the rotating drum 54.

Figure 2:
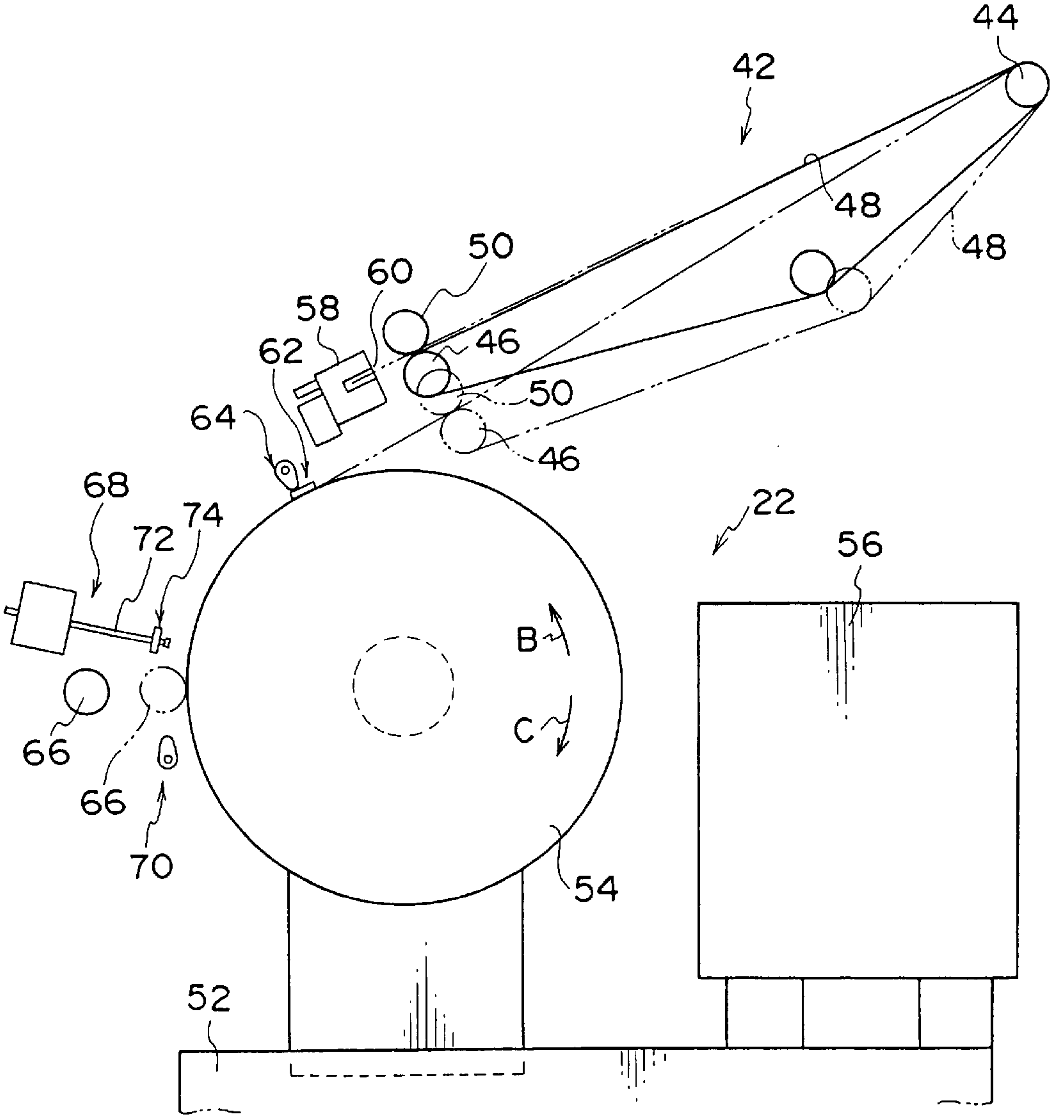
FIG. 2 is a schematic structural view of a recording section of the first embodiment.

The rotating drum 54 is rotated by a driving means (not shown) in a direction in which the print plate 12 is mounted and exposed (a direction shown by the arrow B in FIGS. 1 and 2) and in a direction in which the print plate 12 is removed, i.e., in a direction which is opposite the direction in which the print plate 12 is mounted and exposed (a direction shown by the arrow C in FIGS. 1 and 2).

As illustrated in FIG. 2, a distal end chuck 62 is mounted, as a fixing device, to the rotating drum provided in the recording section 22 at a predetermined position of the outer circumferential surface of the rotating drum 54. When the print plate 12 is mounted to the rotating drum 54, firstly, the distal end chuck 62 stops the rotating drum 54 at a position which opposes the distal end of the print plate 12 fed by the conveyer 42 (print plate mounting position).

The recording section 22 is provided with a mounting cam 64 which opposes the distal end chuck 62 at the print plate mounting position. The mounting cam 64 is pivoted to press one end side of the distal end chuck 62, thereby the print plate 12 can be inserted between the circumferential surface of the rotating drum 54 and the distal end chuck 62. In the recording section 22, with the distal end of the print plate 12 being inserted between the distal end chuck 62 and the rotating drum 54, if the mounting cam 64 is pivoted so as to release the pressing on the distal end chuck 62, the distal end of the print plate 12 is nipped and held between the distal end chuck 62 and the circumferential surface of the rotating drum 54. At this time, the print plate 12 is positioned relative to the rotating drum 54 by a positioning pin (not shown), which is protruded from the predetermined position on the circumferential surface of the rotating drum 54, by being entered into the cutout punched by the puncher 58.

In the recording section 22, when the distal end of the print plate 12 is fixed to the rotating drum 54, the rotating drum 54 is rotated in the direction in which the print plate 12 is mounted and exposed. Therefore, the print plate 12 fed from the conveyer 42 is wrapped around the circumferential surface of the rotating drum 54.

A squeeze roller 66 is disposed near the circumferential surface of the rotating drum 54 at the downstream side with respect to the print plate mounting position in the direction in which the print plate is mounted and exposed. The squeeze roller 66 is moved toward the rotating drum 54 to press the print plate 12 which is wrapped around the rotating drum 54 toward the rotating drum 54 such that the print plate 12 is tightly adhered to the circumferential surface of the rotating drum 54.

In the recording section 22, a back end chuck mounting/dismounting unit 68 is provided near the rotating drum 54 at the upstream side with respect to the squeeze roller 66 in the direction in which the print plate is mounted and exposed. A removing cam 70 is disposed near the downstream side in the direction in which the print plate is mounted and exposed. In the back end mounting/dismounting unit 68, a back end chuck 74 is mounted to a distal end of a shaft 72 which protrudes toward the rotating drum 54.

In the recording section 22, when the back end of the print plate 12 which is wrapped around the rotating drum 54 opposes the back end chuck mounting/dismounting unit 68, the shaft 72 is protruded such that the back end chuck 74 is mounted at a predetermined position on the rotating drum 54. Thus, the back end chuck 74 nips and holds the back end of the print plate 12 between the rotating drum 54 and the back end chuck 74.

In the recording section 22, when the distal end and the back end of the print plate 12 are held on the rotating drum 54, the squeeze roller 66 is moved away from the rotating drum 54. Thereafter, in the recording section 22, while the rotating drum 54 is rotated at a predetermined high rotational speed, a light beam which is modulated based on image data from the recording head section 56 is irradiated, and is synchronized with rotation of the rotating drum 54. As a result, the print plate 12 is scanned and exposed on the basis of the image data.

In the recording section 22, when the scanning-and-exposing of the print plate 12 is finished, the back end chuck 74 which holds the back end of the print plate 12 temporarily stops the rotating drum 54 at a position in which the back end of the print plate 12 opposes the back end chuck mounting/dismounting unit 68, and the print plate 12 is nipped between the rotating drum 54 and the squeeze roller 66. When the back end chuck 74 opposes the back end of the print plate and the rotation of the rotating drum 54 is stopped, in the back end chuck mounting/dismounting unit 68, the back end chuck 74 is removed from the rotating drum 54. As a result, the back end of the print plate 12 is released.

In the recording section 22, when the back end chuck 74 is removed from the rotating drum 54, the rotating drum 54 is rotated in a direction in which the print plate 12 is removed. Thus, the print plate 12 is fed from its back end from between the squeeze roller 66 and the rotating drum 54.

As illustrated in FIG. 1, the discharge buffer section 24 is disposed above the squeeze roller 66. When the rotating drum 54 is rotated in a direction in which the print plate 12 is removed, the print plate 12 is fed from its back end toward the discharge buffer section 24. The rotating drum 54 is rotated in a direction in which the print plate 12 is taken out and stops at the print plate removing position in which the distal end chuck 62 opposes the removing cam 70. In the recording section 22, the removing cam 70 is pivoted to press the distal end chuck 62, and the distal end of the print plate 12 is released from being nipped between the distal end chuck 62 and the rotating drum 54. In this way, the print plate 12 is removed from the rotating drum 54.

The discharge buffer section 24 is provided at the inside of a discharge port 76 formed at the machine frame 14, and includes a discharge roller 78. A plurality of small rollers (for example, small rollers 80A, 80B, 80C, 80D and 80E) are disposed around the discharge roller 78, and an endless conveying belt 82 is passed across the small rollers 80A, 80B, 80C, 80D and 80E. Thus, the conveying belt 82 is entrained about the discharge roller 78 in a range from ½ to ¾ of the circumference of the discharge roller 78 by being extended between the small rollers 80A and 80E.

The small roller 80A is formed so as to protrude toward the squeeze roller 66 side in the recording section 22, and a roller 84 is disposed to oppose the small roller 80A. The print plate 12 fed from the recording section 22 is guided toward between the small roller 80A and the roller 84 and is nipped therebetween.

In the discharge buffer section 24, the discharge roller 78 is rotationally driven in a direction in which the print plate 12 is taken in (in a direction shown by the arrow D), and therefore the print plate 12 nipped by the small roller 80A and 84 is drawn from the recording section 22 to be guided between the discharge roller 78 and the conveying belt 82. Then, the print plate 12 is nipped by the discharge roller 78 and the conveying belt 82 to be entrained about the discharge roller 78. In the discharge buffer section 24, the distal end portion of the print plate 12 (the distal end chuck 62 side in the recording section 22) is nipped by the small roller 80A and the roller 84 such that the print plate 12 entrained about the discharge roller 78 is temporarily held.

On the other hand, as shown by two-dot chain lines, in the discharge buffer section 24, the small roller 80A and the roller 84 move to a position in which the small roller 80A and the roller 84 oppose the discharge port 76. At this time, the small roller 80A and the idle roller 84 are integrally rotated, and therefore the distal end of the print plate 12 is directed to the discharge port 76. A small roller 80B which is positioned above the small roller 80A is moved following the movement of the small roller 80A, and applies constant tension to the conveying belt 82.

In the discharge buffer section 24, when the distal end of the print plate 12 is directed to the discharge port 76, the discharge roller 78 is rotationally driven in a direction in which the print plate 12 is fed out (a direction opposite a direction shown by the arrow D) at a rotational speed corresponding to a conveying speed of the print plate 12 in a processing device such as an automatic developing device or the like, which is disposed adjacently to the discharge port 76. Thus, the print plate 12 is fed out from the discharge port 76.

The distal end chuck 62 and the back end chuck 74 are provided at the rotating drum 54 as fixing devices which fix the print plate 12. The distal end chuck 62 is mounted to the rotating drum 54 so as to fix the distal end of the print plate 12 to a predetermined position. The back end chuck 74 is mounted to the rotating drum 54 so as to oppose the back end of the print plate 12 wrapped round the rotating drum 54.

Figure 3:
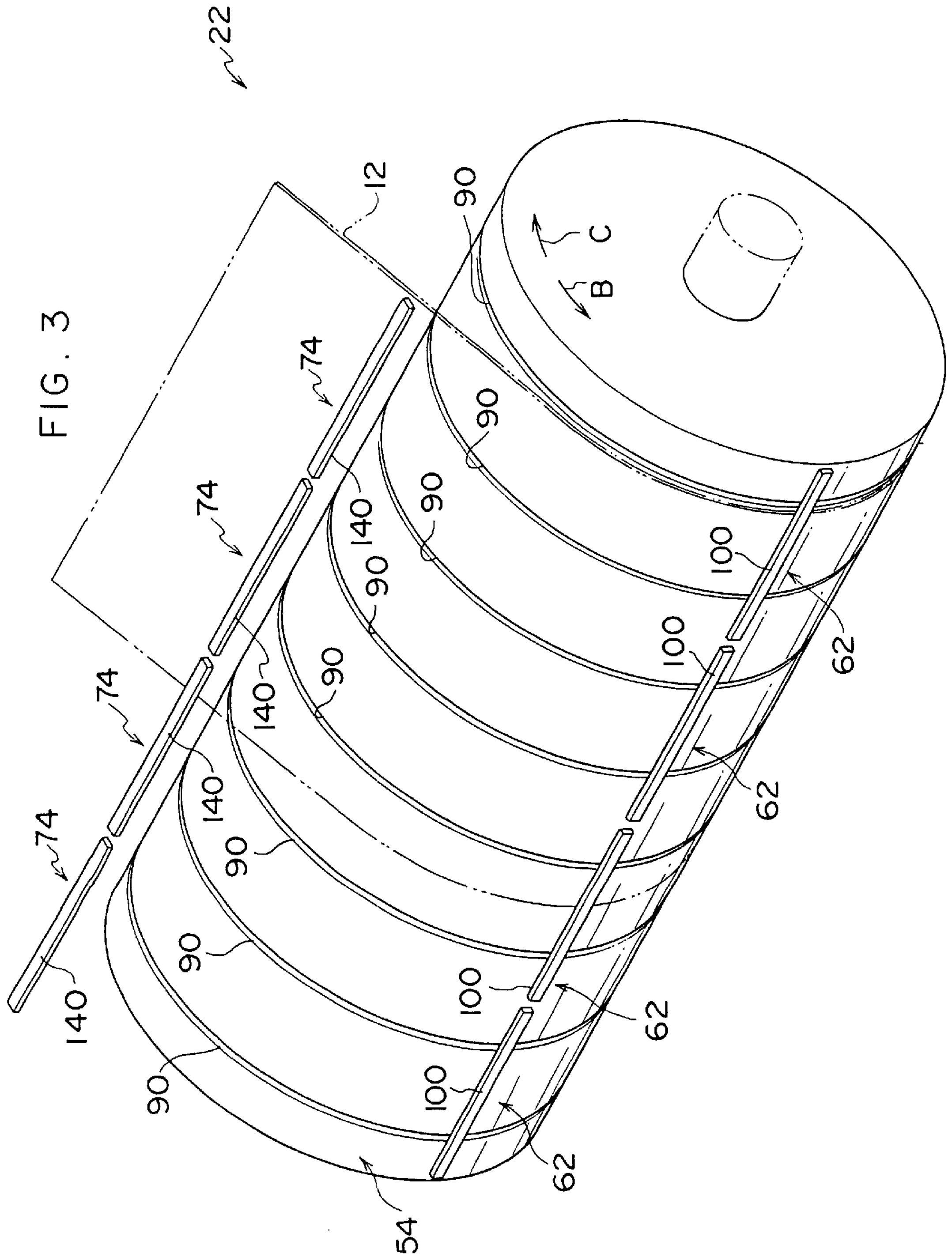
FIG. 3 is a schematic perspective view showing an arrangement of a distal end chuck and a back end chuck with respect to a rotating drum.
Figure 4:
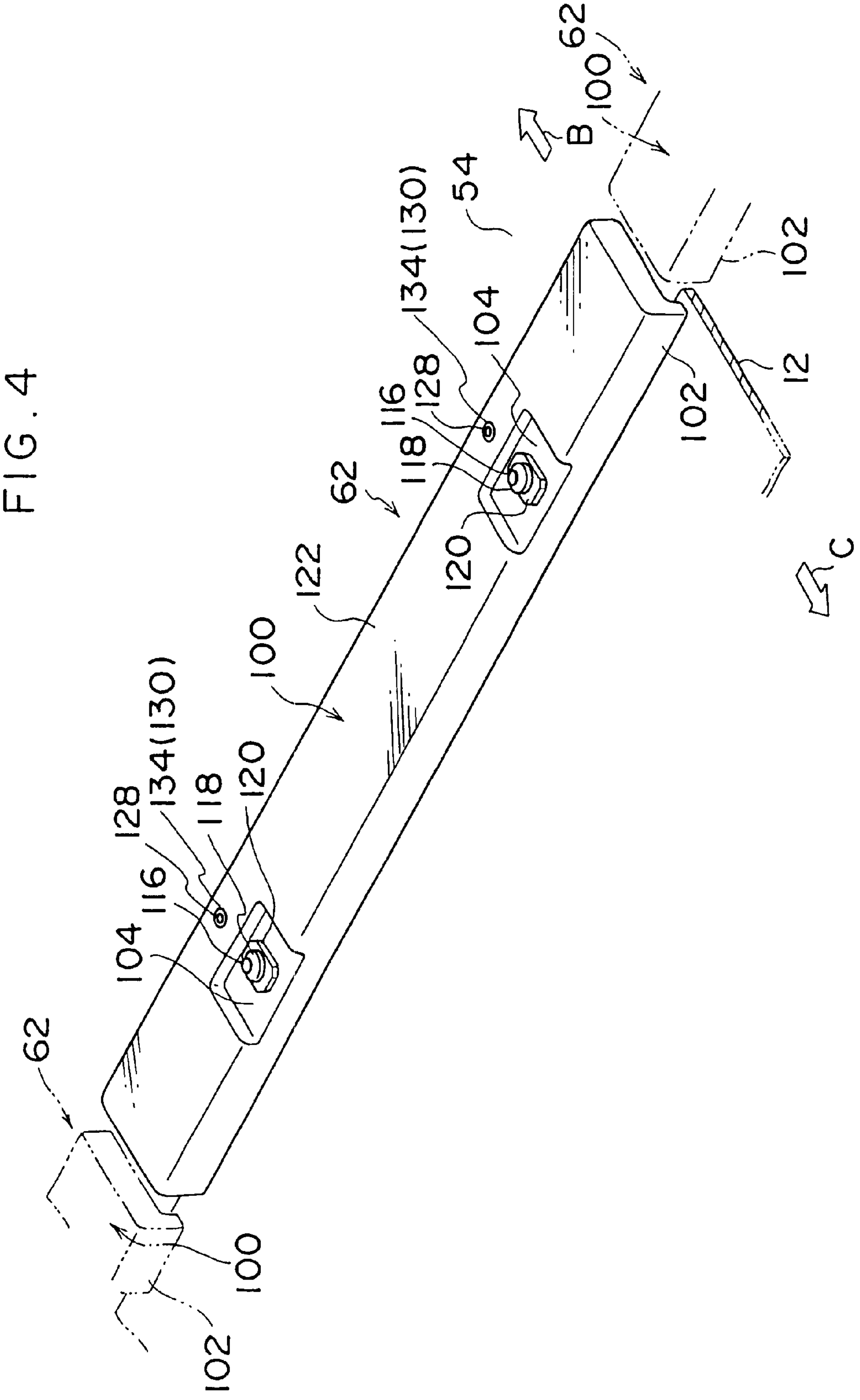
FIG. 4 is a schematic perspective view of the distal end chuck.
Figure 8:
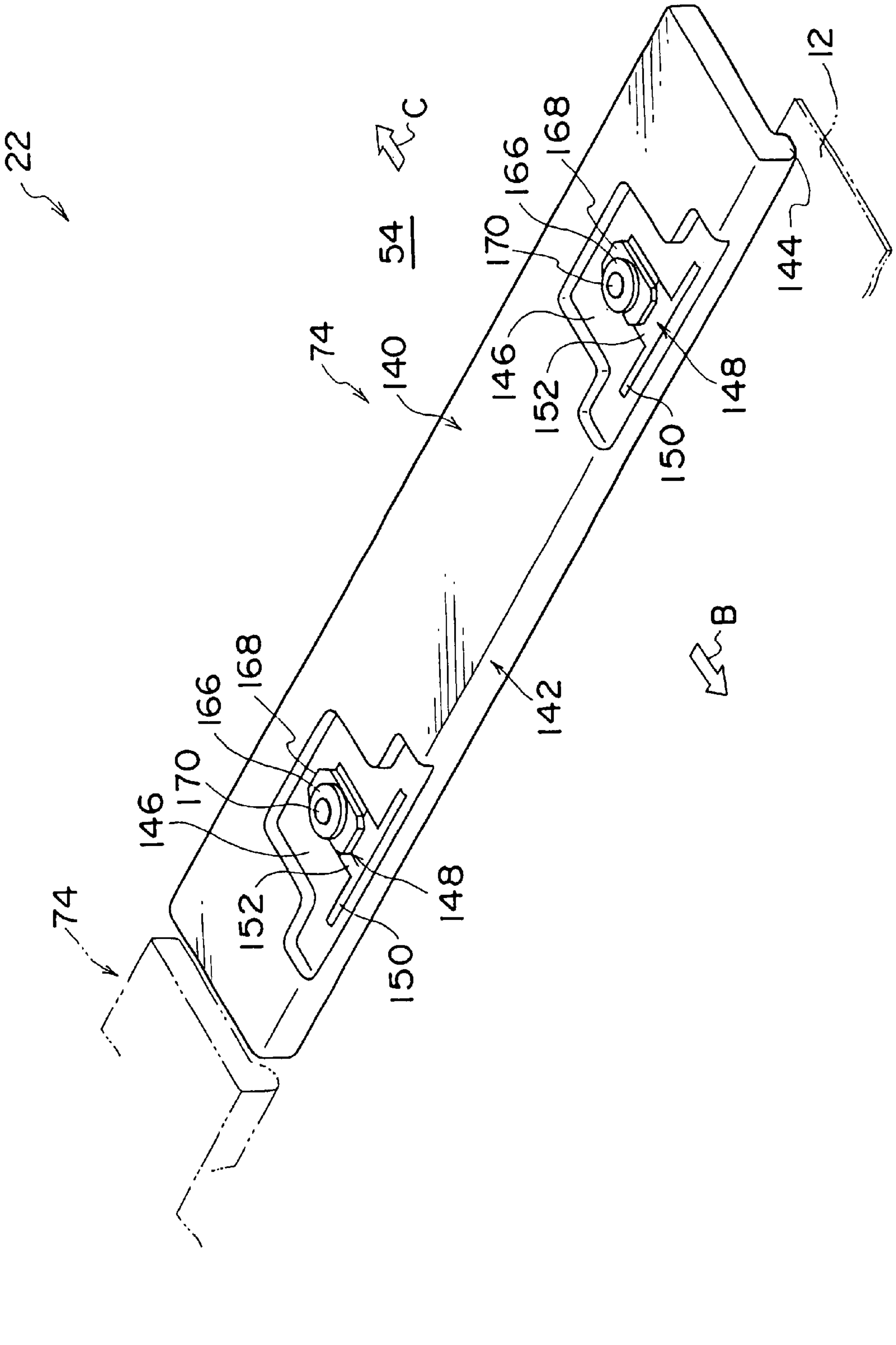
FIG. 8 is a schematic perspective view of a back end chuck.

As shown in FIGS. 3 and 4, the distal end chuck 62 is provided with a clamp 100 which is formed in a band plate shape having a predetermined length as a first clamp. The clamps 100 are disposed at predetermined intervals on the rotating drum 54 along an axial direction thereof. As shown in FIGS. 3 and 8, a clamp 140 formed in a band plate shape having a predetermined length is disposed around the rotating drum 54 as a second clamp. The clamps 140 are disposed at predetermined intervals on the rotating drum 54 along the axial direction thereof.

A description will be given of the distal end chuck 62 with reference to FIGS. 3 to 7.

As illustrated in FIG. 3, the distal end chuck 62 includes a clamp 100 which is formed in a band plate shape and has a predetermined length. The clamps 100 are disposed at predetermined intervals on the rotating drum 54 in an axial direction thereof.

As shown in FIGS. 4 to 7, the clamp 100 has a clamp portion 102 at one widthwise direction end which clamp portion is protruded towards a circumferential surface of the rotating drum. The clamp portion 102 presses the distal end of the print plate 12 with respect to an outer circumferential surface of the rotating drum 54 so as to fix the print plate 12 to the rotating drum 54.

Substantially rectangular shaped recess portions 104 are formed at a plurality of positions on a surface of the clamp 100 which surface is on the opposite side of the clamp portion 102. Each recess portion 104 is provided with a leg 106 as supporting means.

Figure 5:
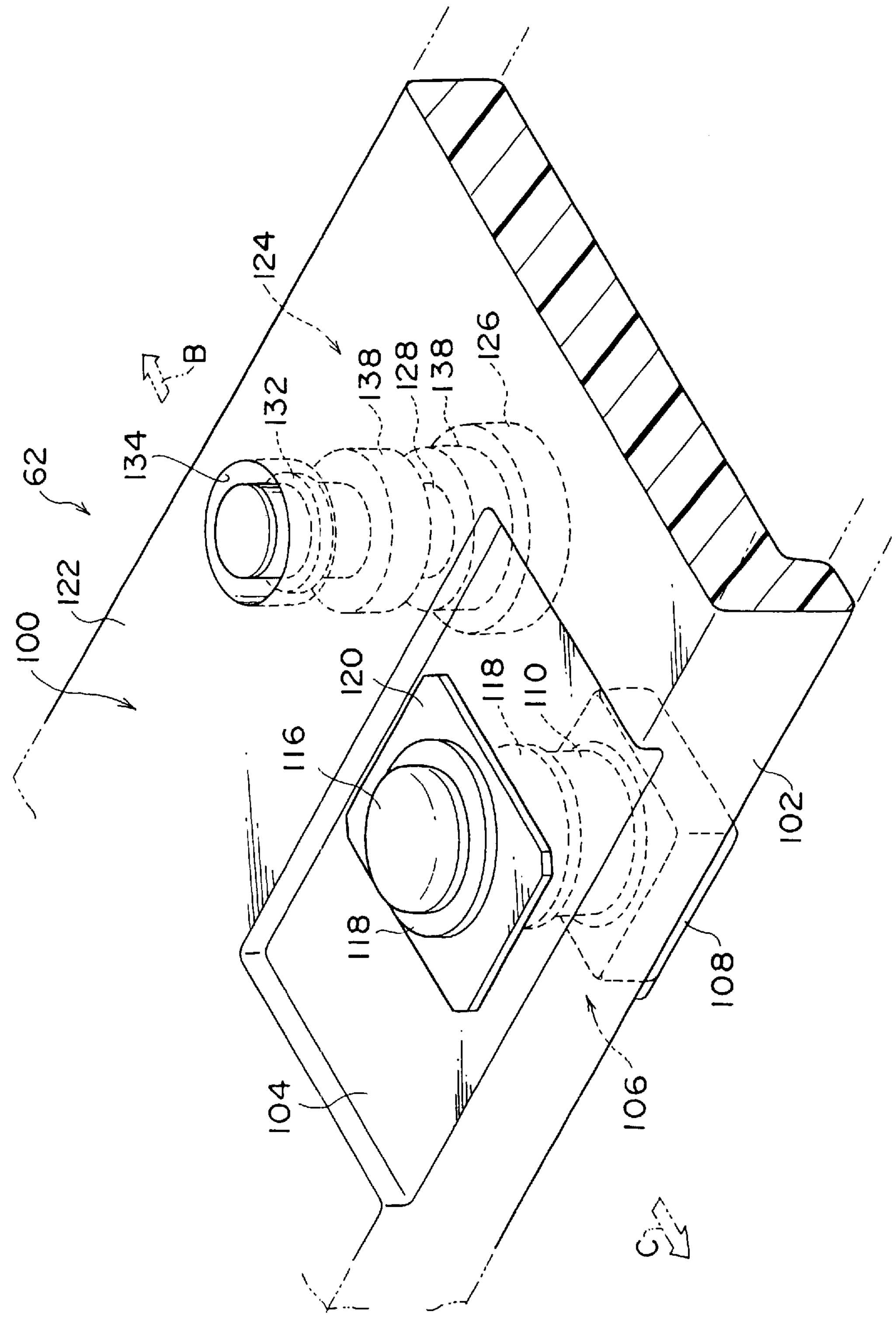
FIG. 5 is an enlarged perspective view of a main portion of the distal end chuck.
Figure 6:
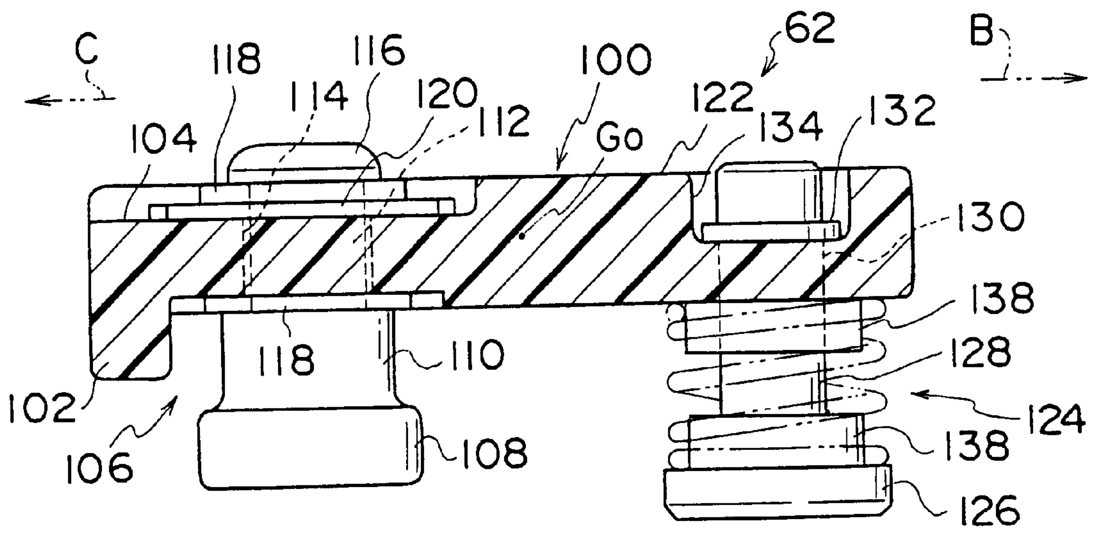
FIG. 6 is an enlarged cross-sectional view of the distal end chuck seen from the longitudinal direction thereof.
Figure 7:
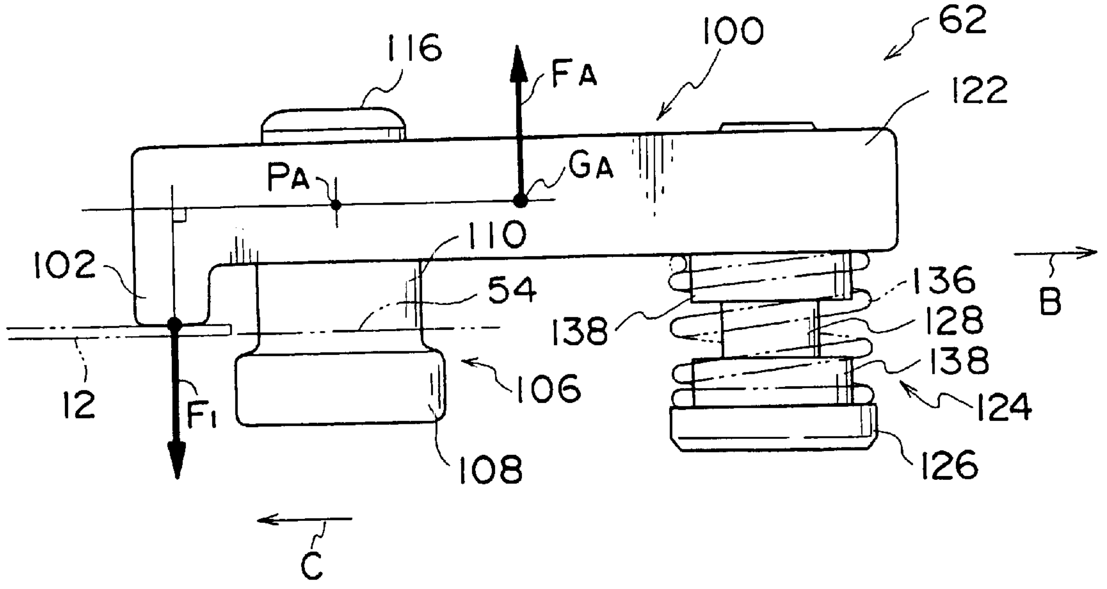
FIG. 7 is a view of the distal end chuck seen from the longitudinal direction thereof, showing a centrifugal force generated at a clamp and a pressing force generated at a clamp portion when a rotating drum rotates.

As shown in FIGS. 5 to 7, each leg 106 has a rectangular block-shaped base portion 108, a leg portion 110 and a supporting shaft 112 having a small diameter (see FIG. 6).

As illustrated in FIG. 6, a through hole 114 is formed at the recess portion 104 of the clamp 100. The supporting shaft 112 of the leg 106 is inserted into the through hole 114. The leg 106 is connected by the clamp 100 being nipped between a screw 116 which is screwed into the distal end of the supporting shaft 112 and the leg portion 110. The distal end chuck 62 is mounted to the rotating drum 54 by the base portion 108 of the leg 106 being inserted further to the inner side than the circumferential surface of the rotating drum 54 and fixed thereto. Any method can be used for fixing the base portion 108 to the rotating drum 54, and therefore detailed descriptions thereof will be omitted.

As shown in FIGS. 5 and 6, a seat plate 118 formed by a resilient body is interposed between the leg portion 110 of the leg 106 and the clamp 100. A similar seat plate 118 and a retaining plate 120 which is formed by a flexible member in a substantially rectangular shape are interposed between the screw 116 and the clamp 100. The inner diameter of the through hole 114 is slightly larger than the outer diameter of the supporting shaft 112 (see FIG. 6).

In the distal end chuck 62, an end portion of the clamp 100 which is on the opposite side of the clamp portion 102 is pressed in a vertical direction (an up-down direction in FIGS. 5 and 6) such that the seat plate 118 is resiliently deformed and the retaining plate 120 is deflected. As a result, the distal end chuck 62 swings with a predetermined position of the supporting shaft 112 being its supporting point (supporting point $P_A$ shown in FIG. 7).

The clamp 100 is provided with a pressing portion 122 which is at the side of the supporting shaft 112 opposite the side at which the clamp portion 102 is formed. The pressing portion 122 is provided with a plurality of urging legs 124 at the rotating drum 54 side of the pressing portion 122 (lower side in FIG. 6). Each urging leg 124 is disposed adjacently to each of the legs 106.

Each urging leg 124 has a substantially disc-shaped wear plate 126 which opposes the circumferential surface of the rotating drum 54. A shaft 128 which is integrally formed with the wear plate 126 is inserted into a through hole 130 (see FIG. 6) formed at the pressing portion 122 of the clamp 100.

A flange portion 132 is formed at an axially intermediate portion of the shaft 128. The through hole 130 communicates with an enlarged diameter portion 134 which is formed at a side of the clamp 100 opposite the side of the rotating drum 54. The flange portion 132 enters within the enlarged diameter portion 134 so as to prevent the shaft 128 from slipping to the rotating drum 54 side.

As shown in FIG. 6, a coil spring 136 is disposed at the urging leg 124 between the wear plate 126 and the clamp 100. The urging leg 124 is protruded towards the rotating drum 54 side by the urging force of the coil spring 136. In FIG. 5, the coil spring 136 is not shown. Guide rings 138 are formed at the wear plate 126 and the clamp 100 so as to prevent the coil spring 136 from being shifted.

In the distal end chuck 62, when the base portion 108 of the leg 106 is fixed to the rotating drum 54 at a predetermined position on the outer circumferential portion thereof, the wear plate 126 abuts the outer circumferential surface of the rotating drum 54. Thus, the pressing portion 122 side of the clamp 100 is urged away from the circumferential surface of the rotating drum 54 by the urging force of the coil spring 136, and the clamp 102 is urged toward the circumferential surface of the rotating drum 54. As illustrated in FIG. 7, the distal end chuck 62 nips the print plate 12 between the clamp portion 102 and the circumferential surface of the rotating drum 54 by the urging force.

When the rotating drum 54 stops at the print plate mounting position or the print plate removing position, the pressing portion 122 of the clamp 100 opposes the mounting cam 64 or the removing cam 70. If the pressing portion 122 is pressed by the mounting cam 64 or the removing cam 70 toward the circumferential surface of the rotating drum 54, the clamp 100 swings against the urging force of the coil spring 136. Thus, the clamp portion 102 is spaced apart from the circumferential surface of the rotating drum 54 such that the print plate 12 can be inserted between the clamp portion 102 and the circumferential surface of the rotating drum 54 or can be removed therefrom.

As shown in FIGS. 6 and 7, the position of the through hole 114 to which the leg 106 is connected deviates to the clamp portion 102 side with respect to the center of gravity $G_A$ of the clamp 100. Namely, the supporting point $P_A$ when the clamp 100 swings, is more toward the clamp portion 102 side with respect to the center of gravity $G_A$.

Therefore, the clamp 100 swings due to a centrifugal force which acts on the clamp 100 when the rotating drum 54 rotates, such that the clamp portion 102 thereof is directed toward the circumferential surface of the rotating drum 54.

Namely, as shown in FIG. 7, a pressing force $F_1$ which is directed toward the center of rotation of the rotating drum 54 acts on the clamp portion 102 due to a centrifugal force $F_A$ which acts on the clamp 100 when the rotating drum 54 rotates. Therefore, the print plate 12 is securely fixed to the circumferential surface of the rotating drum 54 not only by the urging force of the coil spring 136 but also by the nipping force of the pressing force $F_1$ corresponding to the centrifugal force $F_A$.

Next, a description will be given of the back end chuck 74 with reference to FIGS. 8 to 10, 11A and 11B. As shown in FIG. 8, the back end chuck 74 has a clamp 140 which is formed in a band shape and has a predetermined length. The back end chuck 74 is disposed such that the longitudinal direction of the clamp 140 extends along the axial direction of the rotating drum 54. A plurality of clamps 140 are disposed on the rotating drum 54 at predetermined intervals along the rotating drum 54 in the axial direction.

Figure 9:
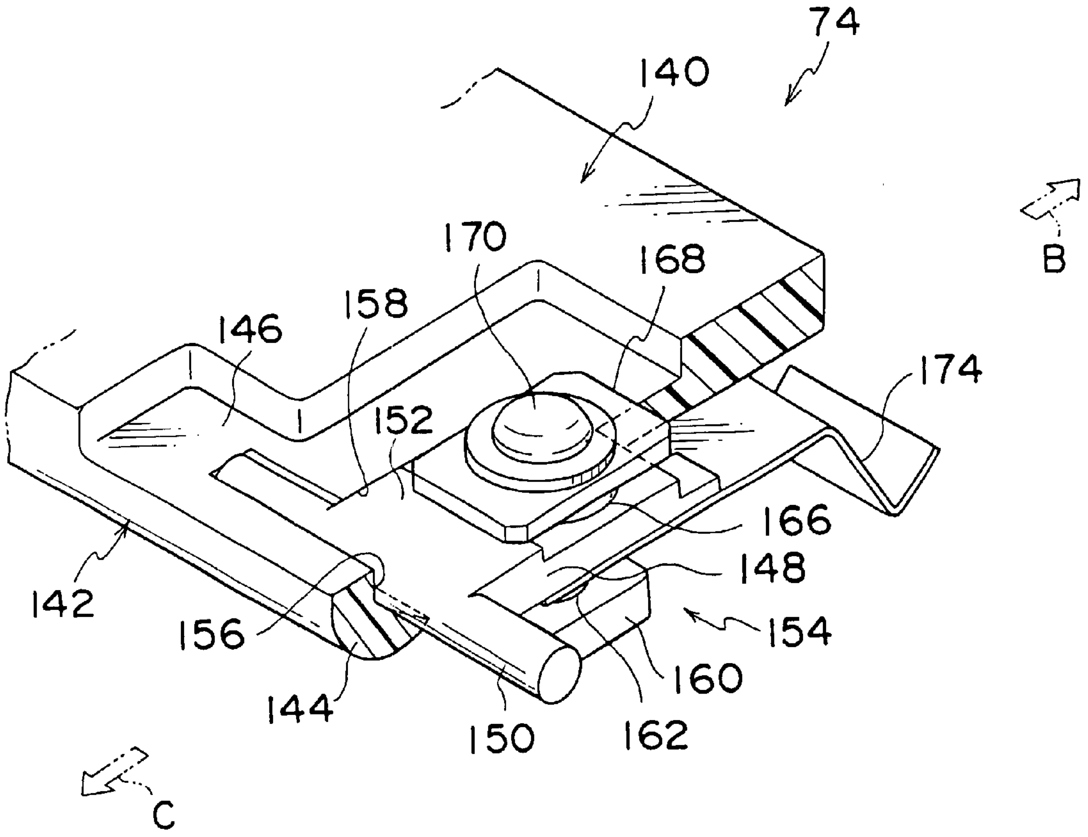
FIG. 9 is an enlarged perspective view of a main portion of the back end chuck.
Figure 10:
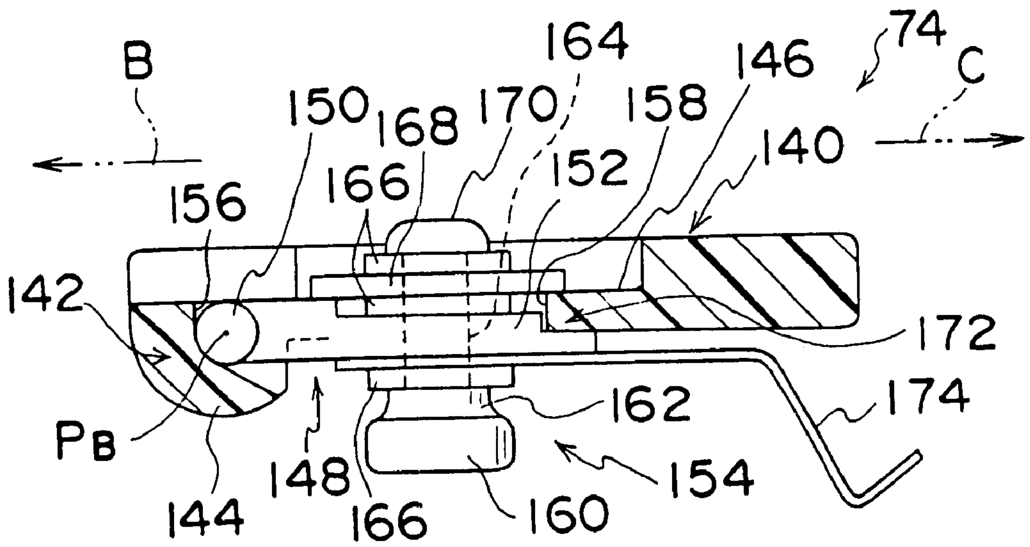
FIG. 10 is a cross-sectional view of the back end chuck seen from the longitudinal direction thereof.
Figure 11A:
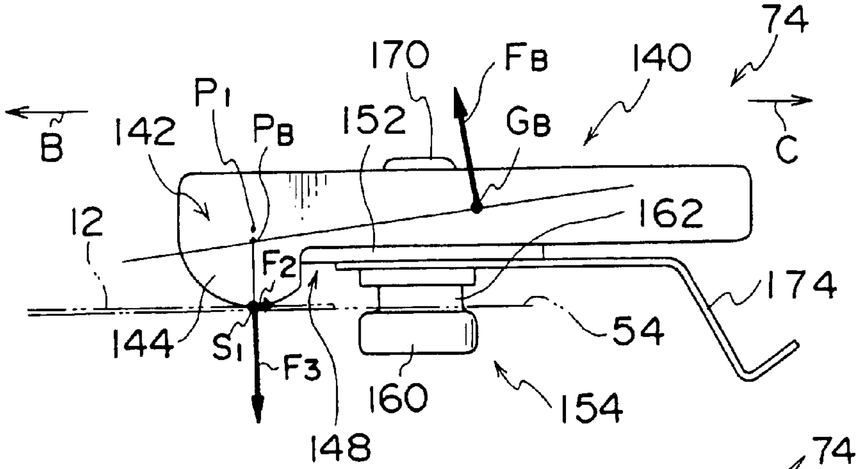
FIG. 11A is a view of the back end chuck seen from the longitudinal direction thereof, showing a centrifugal force generated at a clamp and a pressing force generated at the clamp portion when a rotating drum rotates.
Figure 11B:
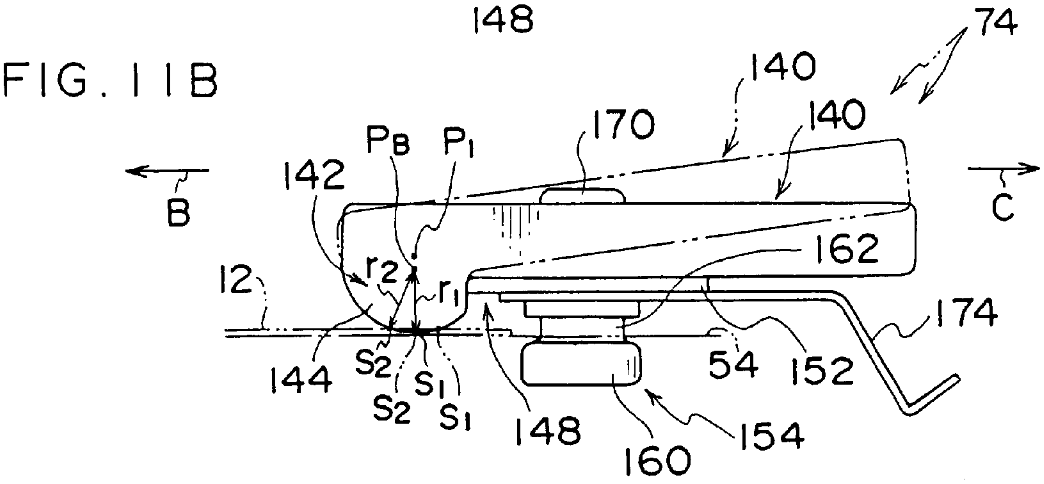
FIG. 11B is a view of the back end chuck seen from the longitudinal direction thereof, for explaining a movement of a clamp by a centrifugal force.

As shown in FIGS. 8 to 10, a clamp portion 142 is formed at one widthwise direction end of the clamp 140. The clamp portion 142 is protruded in a direction perpendicular to the widthwise direction of the clamp 140. As shown in FIGS. 11A and 11B, a distal end portion of the clamp portion 142 is curved in an arc about a predetermined position $P_1$ so as to form an abutting portion 144.

The back end chuck 74 is mounted to the rotating drum 54 with the abutting portion 144 being directed to the circumferential surface of the rotating drum 54. Thus, the abutting portion 144 abuts the peripheral edge of the back end portion of the print plate 12 wrapped around the rotating drum 54 such that the print plate 12 is nipped and held between the clamp portion 142 and the rotating drum 54.

As shown in FIG. 8, the clamp 140 is provided with a plurality of recess portions 146 at a surface of the clamp 140 which is opposite to the surface which opposes the rotating drum 54 (a surface on the front side of the paper surface in FIG. 8). The planar configuration of each recess portion 146 is a substantially T shape, and the recess portions 146 are formed at the clamp portion 142 side. As shown in FIGS. 9 and 10, in the back end chuck 74, supporting members 148 are mounted to respective recess portions 146.

As shown in FIG. 9, a base plate 152 is extended from an intermediate portion of the supporting member 148 along the axial direction of a shaft 150. A leg 154 is mounted to the base plate 152.

As shown in FIG. 3, a plurality of mounting grooves 90 are formed at the circumferential surface of the rotating drum 54 at predetermined intervals in an axial direction of the rotating drum 54. The back end chuck 74 is mounted to the rotating drum 54 such that the supporting member 148 is inserted into the mounting groove 90 (a mounted state of the back end chuck 74 is not shown). In the first embodiment, for example, a pair of two mounting grooves 90 corresponds to one clamp 140. The clamp 140 is provided with two supporting members 148.

The mounting groove 90 is formed around substantially whole circumference of the rotating drum 54. Thus, regardless of the size of the print plate 12, the back end chuck 74 can be mounted to a position opposing the back end of the print plate 12.

A groove 156 whose direction extends along the longitudinal direction of the clamp 140 is formed in the clamp 140 at the clamp portion 142 side of the recess portion 146. A rectangular hole 158 is formed within the recess portion 146 so as to be adjacent to the groove 156. The shaft 150 is fitted into the groove 156 and the base plate 152 is fitted into the rectangular hole 158. Thereby, the supporting member 148 is mounted to the clamp 140 so as to be swingable about the shaft 150.

That is, as shown in FIGS. 11A and 11B, the clamp 140 can swing with respect to the supporting member 148 with the shaft center of the shaft 150 (not shown in FIGS. 11A and 11B) being the supporting point $P_B$.

As illustrated in FIGS. 9 and 10, the leg 154 includes a base portion 160 which is formed in a rectangular block shape, a leg portion 162 and a shaft 164 (see FIG. 10). The shaft 164 is inserted into a through hole (not shown) formed at the base plate 152 of the supporting member 148 and connected thereto.

As shown in FIG. 10, a seat plate 166 formed in a ring shape by a resilient body is interposed between the leg portion 162 and the base plate 152. On the upper side of the base plate 152, a wear plate 168 formed in a substantially rectangular shape by a flexible member is interposed between the seat plates 166. The wear plate 168 and the seat plates 166 which nip the wear plate 168 are mounted by a screw 170 screwed into the shaft 164.

The wear plate 168 is passed across from the shaft 150 side of the base plate 152 to the recess portion 146 of the clamp 140. A step portion 172 is formed at an end portion of the base plate 152 which is opposite to the shaft 150. A peripheral edge portion of the rectangular hole 158 of the clamp 140 is nipped between the step portion 172 and the wear plate 168.

When the seat plates 166 are resiliently deformed and the wear plate 168 is deflected, the clamp 140 swings with respect to the supporting member 148 with its axis (supporting point $P_B$) being the shaft 150 of the supporting member 148.

In the supporting member 148, one end of a plate spring 174 is nipped between the leg portion 162 of the leg 154 and the base plate 152 of the supporting member 148 and mounted therebetween. The other end of the plate spring 174 is bent to the rotating drum 54 side.

If the base portion 160 of the leg 154 is fitted into a predetermined position on the rotating drum 54 with the abutting portion 144 of the clamp portion 142 opposing the back end portion of the print plate 12, the back end chuck 74 is mounted to the rotating drum 54. At this time, the plate spring 174 abuts the circumferential surface of the rotating drum 54 so as to be resiliently deformed.

The back end chuck 74 is urged by the urging force generated by the plate spring 174 being resiliently deformed so as to direct the abutting portion 144 of the clamp 142 to the circumferential surface of the rotating drum 54. Thus, the print plate 12 is nipped between the abutting portion 144 and the rotating drum 54.

The back end chuck 74 is mounted to the rotating drum 54 by using a plurality of mounting grooves 90 (see FIG. 3) which are formed at the circumferential surface of the rotating drum 54 at predetermined intervals. The interior of each mounting groove 90 is widened. The base portion 160 of the leg 154 is inserted into the mounting groove and the base portion 160 is rotated with the shaft 164, thus the circumferential surface of the base portion 160 abuts the inner surface of the groove and is fixed thereto. Structure (not shown) may be used in place of the above-described structure.

As shown in FIGS. 10, 11A and 11B, the supporting point $P_B$ in a case in which the clamp 140 swings with respect to the supporting member 148 is positioned at the clamp portion 142 side with respect to the center of gravity $G_B$ of the clamp 140. The supporting point $P_B$ is positioned at the rotating drum 54 side with respect to the point $P_1$ which is the center of an arc of the abutting portion 144.

When the rotating drum 54 rotates, a centrifugal force is generated at the clamp 140. The centrifugal force $F_B$ acts so as to rotate the clamp 140 about the supporting point $P_B$ in a direction in which the center of gravity $G_B$ is spaced apart from the rotating drum 54.

Therefore, the clamp portion 142 is also rotated about the supporting point $P_B$, the abutting position to the print plate 12 is shifted in a direction opposite the rotational direction, and the back end portion of the print plate 12 which abuts the abutting portion 144 is pulled in a direction in which the print plate 12 is pulled. Namely, the abutting portion 144 which abuts the print plate 12 is formed in a circular arc, and therefore a tensile force $F_2$ is generated at the abutting position S of the abutting portion 144 to the print plate 12 in a direction in which the print plate 12 is pulled due to the centrifugal force $F_B$.

In the abutting portion 144 which abuts the print plate 12, the point $P_1$ which is a center of a circular arc surface which opposes the print plate 12 is positioned at an outer side in a radial direction of the rotating drum 54 with respect to the supporting point $P_B$. Thus, the distance $r_1$ from the supporting point $P_B$ to the abutting position $S_1$ of the abutting portion 144 to the print plate 12 when the rotating drum 54 stops is shorter than the distance $r_2$ from the supporting point $P_B$ to the abutting position $S_2$ (shown by two-dot chain lines in FIG. 11B) of the abutting portion 144 to the print plate 12 when the rotating drum 54 rotates (i.e., $r_1<r_2$).

When the clamp 140 rotates due to the centrifugal force $F_B$, the pressing force $F_3$ of the clamp portion 142 on the print plate 12 becomes large and the tensile force $F_2$ is decreased. Further, rotation of the clamp 140 due to the centrifugal force $F_B$ is suppressed by a drag against the pressing force $F_3$. That is, a center of curvature of the abutting portion 144 (the point $P_1$) is positioned at the rotating drum 54 side with respect to the supporting point $P_B$, and therefore pulling of the print plate 12 by the clamp 140 is restricted and the print plate 12 cannot be pulled out more than needed.

An operation of the first embodiment will be described hereinafter.

In the image exposure device 10, image data for exposing the print plate 12 is inputted, the size of the print plate 12 to be subjected to image exposure and the number of the print plate 12 to be exposed are set. When the starting of image exposure is instructed, image exposure processing on the print plate 12 starts. The processing may be instructed by operating switches of an operation panel provided in the image exposure device 10. Alternatively, the starting of processing of the image exposure device 10 may be instructed by a signal from an image processing device or the like which outputs image data to the image exposure device 10.

In the image exposure device 10, when the starting of processing is instructed, the sheet unit 30 is moved with the inverting unit 28 to a position corresponding to the cassette 16 which accommodates the print plate 12 with a designated size. The print plate 12 within the corresponding cassette 16 is suctioned by the suckers 38 and is removed from the cassette 16. Then, the print plate 12 is fed between the inverting roller 32 and the conveying belt 36 in the inverting unit 28. Thus, the print plate 12 is nipped and conveyed by the inverting roller 32 and the conveying belt 36 to be fed to the conveyer 42.

The distal end of the print plate 12 is inserted into the holding opening of a gripper 60 by the conveyer 42. The puncher 58 punches a cutout for positioning at a predetermined position on the print plate 12. When the cutout is punched at the print plate 12, the conveyer 42 draws the print plate 12 from the holding opening of a gripper 60 to feed the print plate 12 onto the circumferential surface of the rotating drum 54.

In the recording section 22, the distal end of the print plate 12 is held to the rotating drum 54 by the distal end chuck 62, and the print plate 12 is wrapped around the rotating drum 54 while being squeezed by the squeeze roller 66. The back end chuck 74 is mounted to the rotating drum 54 so as to correspond to the back end position of the print plate 12 wrapped around the rotating drum 54, and therefore the back end portion of the print plate 12 is fixed to the rotating drum 54.

Thereafter, a light beam based on image data is irradiated to the print plate 12 from the recording head portion 56 while the rotating drum 54 is rotated at a high speed, and thereby the print plate 12 is scanned and exposed. When the scan-exposure of the print plate 12 is finished, the back end chuck 74 is removed from the rotating drum 54 and the print plate 12 is fed out to the discharge buffer section 24.

In the discharge buffer section 24, the print plate 12 is nipped and conveyed by the small roller 80A and the roller 84 so as to be entrained about the discharge roller 78. Then, the small roller 80A and the roller 84 oppose the discharge port 76 and the print plate 12 is fed out from the discharge port 76 at a predetermined conveying speed.

In the recording section 22, the mounting cam 64 presses the pressing portion 122 downward against the urging force of the coil spring 136, and the clamp portion 102 is thereby spaced apart from the circumferential surface of the rotating drum 54 such that the print plate 12 can be inserted. When downward pressing of the pressing portion 122 by the mounting cam 64 is released, the distal end chuck 62 nips the distal end of the print plate 12 between the clamp portion 102 and the rotating drum 54. In this way, the distal end of the print plate 12 is fixed to the rotating drum 54.

On the other hand, the back end chuck 74 is mounted to the rotating drum 54 at a position in which the back end of the print plate 12 opposes the clamp portion 142. The back end chuck 74 is mounted to the rotating drum 54, and the plate spring 174 abuts the circumferential surface of the rotating drum 54 and resiliently deforms. The back end portion of the print plate 12 is nipped between the clamp portion 142 and the rotating drum 54 and is fixed therebetween by the urging force generated by the plate spring 174 being resiliently deformed.

At this time, the back end chuck 74 is mounted to the rotating drum 54 such that the supporting member 148 is inserted into the mounting groove 90 which is formed at the outer circumferential portion of the rotating drum 54. Since the mounting groove 90 is formed along the circumferential direction of the rotating drum 54, the back end chuck 74 can be mounted to any position along the circumferential direction of the rotating drum 54. As a result, regardless of the size of the print plate 12, the distal end and the back end of the print plate 12 are reliably nipped between the distal end chuck 62 and the rotating drum 54 and between the back end chuck 74 and the rotating drum 54 so as to fix the print plate 12 to the rotating drum 54.

The distal end portion and the back end portion of the print plate 12 wrapped around the rotating drum 54 are fixed to the distal end chuck 62 and the back end chuck 74, respectively.

As shown in FIG. 7, when the rotating drum 54 rotates, the centrifugal force $F_A$ acts on the clamp 100 of the distal end chuck 62. A rotation moment with its center being the supporting point $P_A$ is generated at the clamp 100 of the distal end chuck 62 by the centrifugal force $F_A$. The pressing force $F_1$ which is directed to the circumferential surface of the rotational drum 54 is generated by the rotation moment.

Accordingly, the print plate 12 is securely fixed between the rotating drum 54 and the distal end chuck 62 by, in addition to the pressing force corresponding to the urging force of the coil spring 136, the pressing force $F_1$ corresponding to the centrifugal force $F_A$. Thus, the distal end chuck 62 can securely fix the distal end of the print plate 12 to a predetermined position on the rotating drum 54.

On the other hand, as shown in FIG. 11A, due to rotation of the rotating drum 54, the centrifugal force $F_B$ acts on the clamp 140 of the back end chuck 74 which fixes the back end portion of the print plate 12 to the rotating drum 54. The rotation moment with its axis being the shaft 150 of the supporting member 148 is generated by the centrifugal force $F_B$.

The clamp portion 142 of the clamp 140 has the abutting portion 144 which abuts the print plate 12. The abutting portion 14 is chamfered in a circular shape (see FIGS. 11A and 11B). At the abutting position $S_1$ at which the print plate 12 is pressed, a tensile force $F_2$ is generated in a tangential direction by the rotation moment caused by the centrifugal force $F_B$. This tensile force $F_2$ is directed to the direction of the arrow C.

Thus, if the rotating drum 54 rotates, the back end portion of the print plate 12 is pulled by the back end chuck 74 in a direction in which the print plate 12 is pulled, and it is possible to prevent the print plate 12 from becoming slack when the rotating drum 54 rotates. Namely, if the print plate 12 is rotated integrally with the rotating drum 54, the print plate 12 would come up from off the circumferential surface of the rotating drum 54 due to the centrifugal force generated at the print plate 12. However, at this time, because the back end chuck 74 pulls the back end portion of the print plate 12 due to the tensile force $F_2$ based on the centrifugal force $F_B$ generated at the clamp 140, it is possible to ensure prevention of offset or coming up of the print plate 12 off the drum surface caused by the print plate 12 wrapped around the rotating drum 54 being spaced away from the circumferential surface of the rotating drum 54.

As shown in FIG. 11B, the supporting point $P_B$ of the back end chuck 74 is positioned at the circumferential surface of the rotating drum 54 side with respect to the point $P_1$ which is a center of a circular arc of the abutting portion 144 which abuts the print plate 12. Thus, by the clamp portion 142 being rotated by the rotation moment, the abutting position at which the print plate 12 abuts is moved from the abutting position $S_1$ to the abutting position $S_2$, and the distance between the supporting point $P_B$ and the print plate 12 becomes long. Accordingly, the pressing force of the clamp portion 142 on the print plate 12 is large and the tensile force $F_2$ is small.

That is, in the back end chuck 74, the centrifugal force $F_B$ acts on the clamp 140 by rotation of the rotating drum 54 so as to rotate the clamp portion 142. Thus, at first, the tensile force $F_2$ is generated together with the pressing force $F_3$. Then, as the pressing force $F_3$ pressing the print plate 12 to the circumferential surface of the rotating drum 54 becomes gradually larger, the tensile force $F_2$ decreases.

Thus, rotation of the clamp portion 142 by the centrifugal force $F_B$ is suppressed, and pulling of the print plate 12 by the clamp 140 is restricted. Accordingly, the print plate 12 cannot be pulled by the clamp 140 more than needed.

When the rotating drum 54 rotates at a high speed in order to scan and expose the print plate 12, not only the print plate 12 cannot come up off the drum surface or be offset, but also mispositioning of the print plate 12 due to excess pulling thereof cannot be caused. As a result, an image can be recorded at an appropriate position on the print plate 12. Further, images recorded on the print plate 12 will not be damaged.

The structure of the present invention is not limited to the above-described first embodiment. For example, in the first embodiment, the back end chuck 74 is inserted into the mounting groove 90 of the rotating drum 54 so as to be mounted to the rotating drum 54. Thus the back end of the print plate 12 is held at any position along the circumferential direction of the rotating drum 54. The back end chuck 74 may be movable within the mounting groove 90 along the circumferential direction of the rotating drum 54. In this way, regardless of the size of the print plate 12, the distal end and the back end of the print plate 12 can be reliably nipped and held between the distal end chuck 62 and the rotating drum 54 and between the back end chuck 74 and the rotating drum 54.

In the first embodiment, the distal end chuck 62 is mounted to a predetermined position on the rotating drum 54, and the back end chuck 74 is mounted to a position corresponding to the size of the print plate 12. The distal end chuck 62 and the back end chuck 74 may be, however, detachable to positions corresponding to the size of the print plate 12.

Second Embodiment

The first embodiment of the image exposure device relating to the present invention has been described. A second embodiment of the image exposure device of the present invention will be explained below. Descriptions of parts and portions, which are (may be) the same as in the above-described first embodiment, are appropriately omitted, and characteristic contents of the second embodiment will be described in detail.

As described above, a plurality of mounting grooves 90 are formed at the circumferential surface of the rotating drum 54 at predetermined spaces. The back end chuck 74 is mounted to the rotating drum 54 by each supporting member 148 being attached to each mounting groove 90. In the second embodiment, as an example, a pair of two mounting grooves 90 corresponds to one clamp 140 of the back end chuck 74. Two supporting members 148 are provided in one clamp 140.

Figure 13:
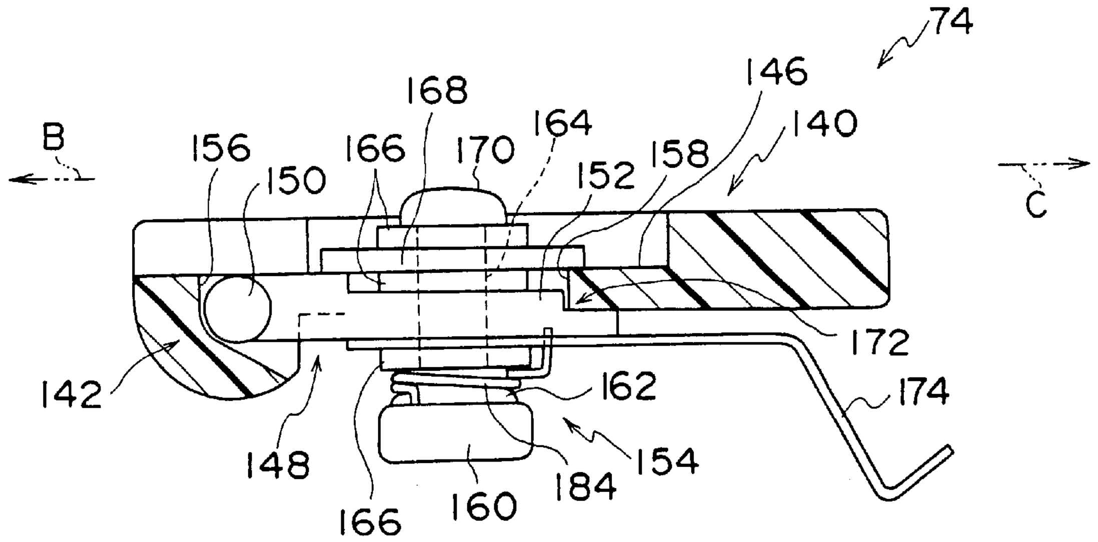
FIG. 13 is an enlarged cross-sectional view of the back end chuck of FIG. 12, seen from the longitudinal direction thereof.
Figure 14:
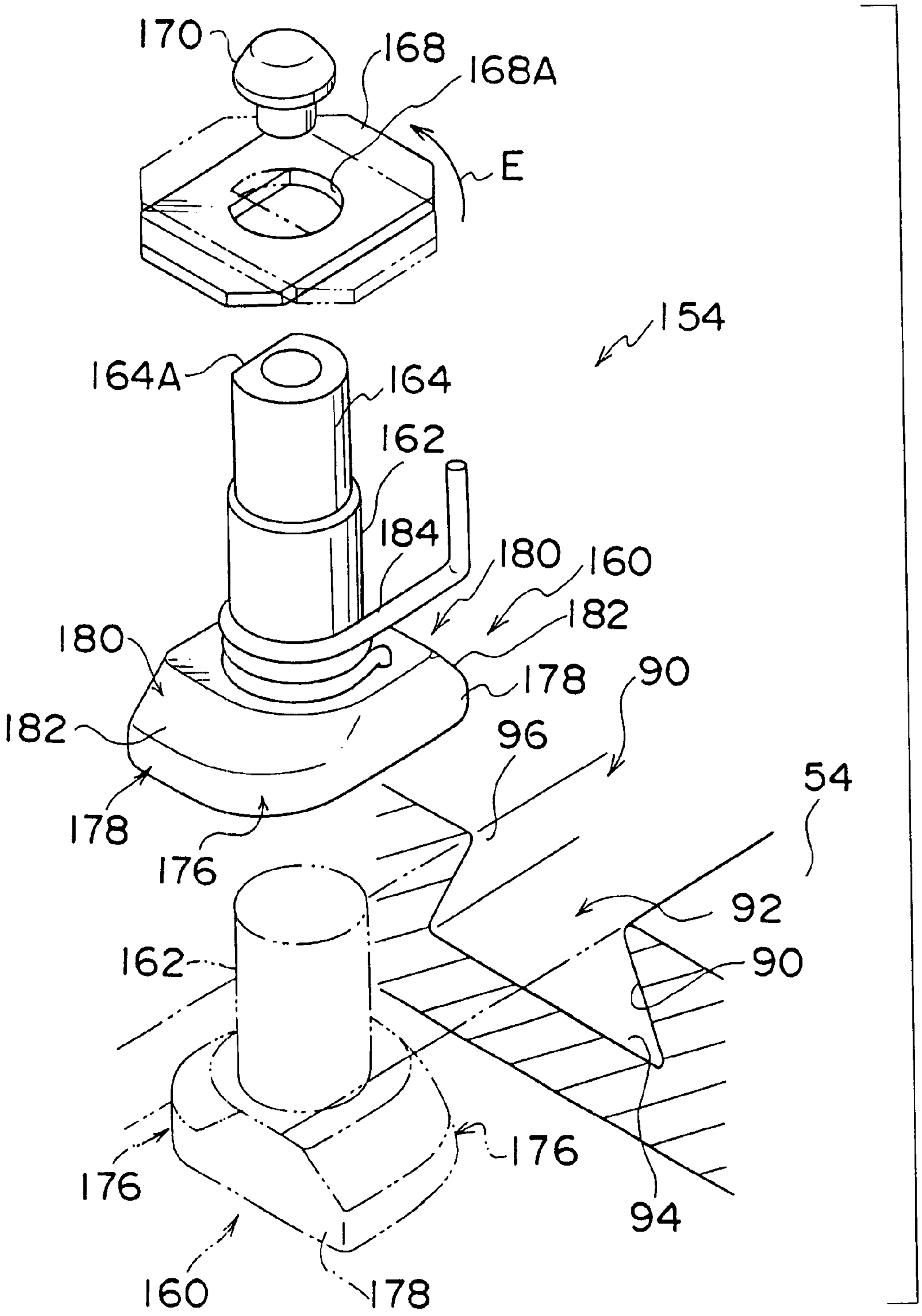
FIG. 14 is an exploded perspective view of a main portion of a fixing piece of a leg of the back end chuck.

As shown in FIGS. 13 and 14, a leg 154 of the supporting member 148 includes a base portion 160 which is formed in a rectangular block shape (referred to as a fixing piece hereinafter), a leg portion 162 (referred to as a supporting shaft hereinafter) and a shaft 164 (referred to as a small diameter portion hereinafter) (see FIG. 14). The small diameter portion 164 is inserted into a through hole (not shown) formed at a base plate 152 of the supporting member 148, and is connected thereto.

Figure 12:
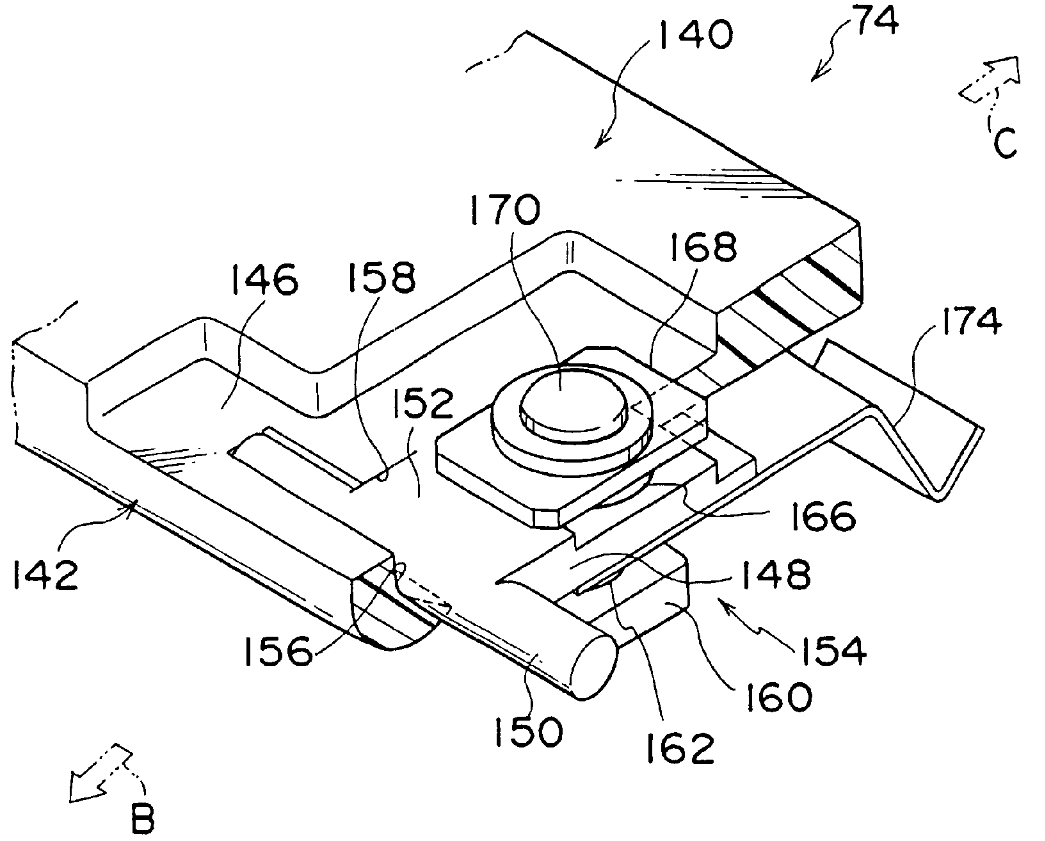
FIG. 12 is an enlarged perspective view of a main portion of a back end chuck of a second embodiment.

As shown in FIGS. 12 and 13, a wear plate 166 is interposed between a supporting shaft 162 and a base plate 152. On the upper side of the base plate 152, a handle plate 168 is disposed so as to be interposed between the wear plates 166. The handle plate 168 and the wear plates 166 which nip the handle plate 168 are mounted by a screw 170 which is screwed into a shaft 164.

As shown in FIG. 14, a cutout 164A along the axial direction of the supporting shaft 162 is formed at the outer circumference portion of the small diameter portion 164 of the supporting shaft 162. A through hole 168A which corresponds to the outer configuration of the small diameter portion 164 is formed at the handle plate 168, and the small diameter portion 164 is inserted into the through hole 168A. Thus, the fixing piece 160 of the leg 154 rotates about the supporting shaft 162 integrally with the handle plate 168.

As shown in FIGS. 12 and 13, the handle plate 168 is disposed within a recess portion 146 of the clamp 140. In the back end chuck 74, the fixing piece 160 is rotated by rotating the handle plate 168. As shown in FIG. 13, a step portion 172 is formed at an end portion of the base plate 152 which is opposite to the shaft 150. A peripheral edge portion of a rectangular hole 158 of the clamp 140 is nipped between the step portion 172 and the handle plate 168. Thus, the clamp 140 cannot be unnecessarily swung with respect to the supporting member 148.

As shown in FIGS. 12 and 13, one end of a plate spring 174 is nipped between the supporting shaft 162 of the leg 154 and the base plate 152 of the supporting member 148 such that the plate spring 174 is mounted to the supporting member 148. The other end of the plate spring 174 is bent toward the rotating drum 54 side (downward in FIGS. 12 and 13).

If the back end chuck 74 is mounted to the rotating drum 54 with the clamp portion 142 opposing the back end portion of the print plate 12, the plate spring 174 abuts the rotating drum 54 so as to be resiliently deformed. Then, a nipping force, by which the print plate 12 is nipped between the clamp portion 142 and the circumferential surface of the rotating drum 54, is applied.

As shown in FIG. 14, the fixing piece 160 is formed in a rectangular block shape such that one side of the fixing piece 160 is longer than the other side thereof. Hereinafter, a direction in which a shorter side of the fixing piece 160 extends will be referred to as a widthwise direction, and a direction in which a longer side of the fixing piece 160 extends will be referred to as a longitudinal direction.

The supporting shaft 162 is provided such that a center of the fixing piece 160 in the widthwise direction and the longitudinal direction is a shaft center.

Figure 15:
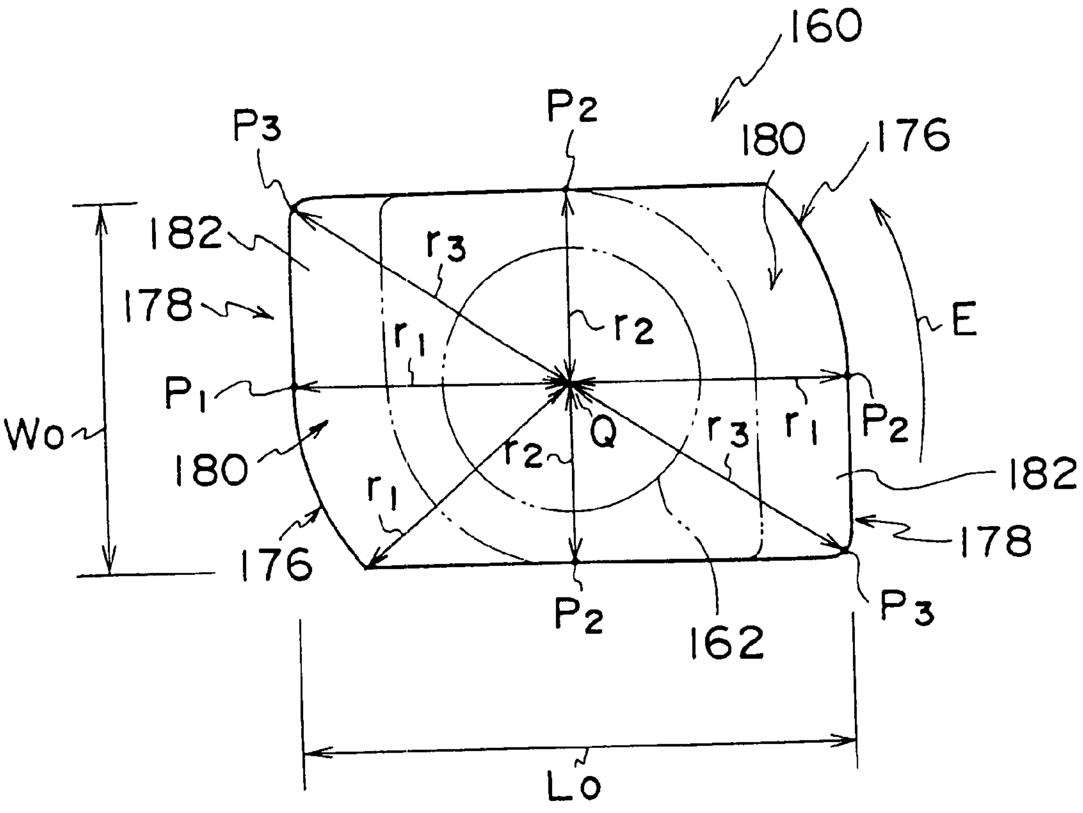
FIG. 15 is a bottom view of the fixing piece.

As shown in FIGS. 14 and 15, a circular arc shaped portion 176 and a linear portion 178 are formed at longitudinal direction end portions of the fixing piece 160. As shown in FIG. 15, the circular arc shaped portion 176 is formed such that one widthwise direction end of the fixing piece 160 is curved about the supporting shaft 162 at a predetermined radius. The outer configuration of the fixing piece 160 is such that the portion from the widthwise direction intermediate point $P_1$ of the fixing piece 160 to the point $P_2$ in the longitudinal direction of the one widthwise direction end portion of the fixing piece 160 is formed in a circular arc. Further, the linear portions 178 are formed at the longitudinal direction end portions of the fixing piece 160 such that the portion from the intermediate point $P_1$ to the other widthwise direction end point $P_3$ is formed in a linear manner along the widthwise direction.

Thus, in the fixing piece 160, the distance $r_2$ from the center Q to the point $P_2$, the distance $r_1$ from the center Q to the intermediate point $P_1$ and the distance $r_3$ from the center Q to the point $P_3$ increase in that order (i.e., $r_2<r_1<r_3$).

As shown in FIG. 14, the fixing piece 160 is provided with inclined portions 180 at the longitudinal direction end portions thereof. Each inclined portion 180 is formed such that an upper portion of the fixing piece 160 is cutout at a predetermined angle. Thus, an inclined surface 182 which contours an inner surface of a mounting groove 90 to be described later is formed at the linear portion 178. The inclined surface 182 at the circular arc shaped portion 176 side is formed in a circular arc with its center being Q.

Figure 16:
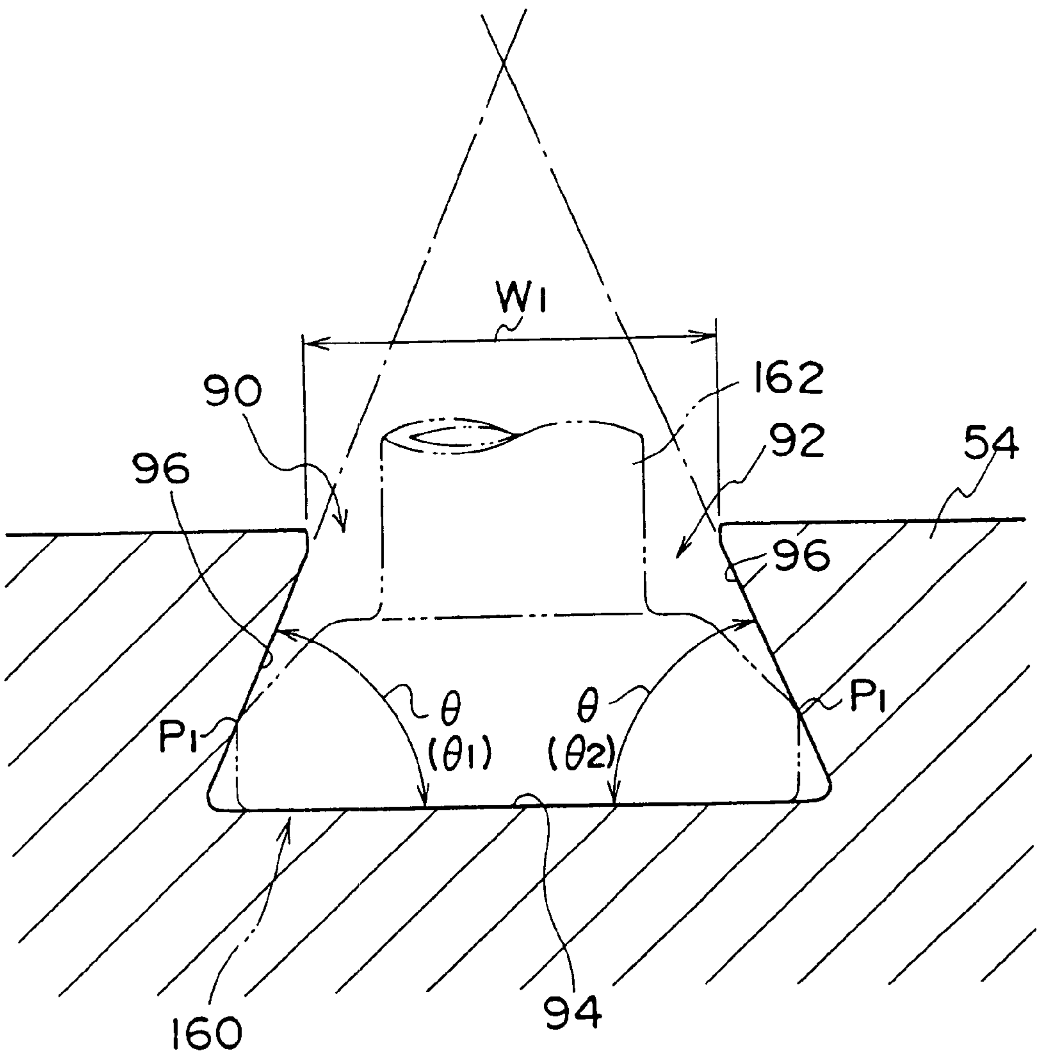
FIG. 16 is a cross-sectional view, along an axis of the rotating drum, of a main portion of a mounting groove formed at the rotating drum.

FIG. 16 illustrates a cross-section of the vicinity of the mounting groove 90 along the axial direction of the rotating drum 54. In the mounting groove 90, a width $W_1$ of an opening near the surface of the rotating drum 54 is slightly larger than a size $W_0$ (see FIG. 15) in the widthwise direction of the fixing piece 160. The width $W_1$ of the opening is narrower than a size $L_0$ (see FIG. 15) in the longitudinal direction of the fixing piece 160. Therefore, the fixing piece 160 can be inserted into and removed from the mounting groove 90 only when the longitudinal direction of the fixing piece 160 aligns with the direction of grooves in the mounting groove 90.

An enlarged width portion 92 is formed within the mounting groove 90 in the rotating drum 54. The enlarged width portion 92 is formed such that widthwise direction inner surfaces of the mounting groove 90 (referred to as inclined surfaces 96 hereinafter) are inclined a predetermined angle θ with respect to a bottom surface 94 of the mounting groove 90. The angle θ is in a range from at least 45° to less than 90°, and in the second embodiment, as an example, the angle θ is about 45°.

The inclined surfaces 96, whose inclined angle is θ, are formed at the enlarged width portion 92. Thereby the width of the opening of the mounting groove 90 is gradually widened toward the bottom surface 94. Due to the enlarged width portion 92, the mounting groove 90 is formed at the rotating drum 54 as an opening whose cross-section in the widthwise direction is a substantially trapezoidal configuration.

As shown in FIG. 14, the fixing piece 160 is inserted into the mounting groove 90 such that the widthwise direction of the fixing piece 160 aligns with the widthwise direction of the mounting groove 90. Then, the fixing piece 160 is rotated from the circular arc shaped portion 176 side thereof in the direction of arrow E such that the longitudinal direction of the fixing piece 160 aligns with the widthwise direction of the mounting groove 90 (shown by two-dot chain lines in FIG. 14).

As shown in FIG. 15, the enlarged width portion 92 of the mounting groove 90 corresponds with the dimension $L_0$ along the longitudinal direction of the fixing piece 160 at a position at which inclined surfaces 96 are spaced apart at a predetermined interval. Thus, if the longitudinal direction of the fixing piece 160 inserted into the mounting groove 90 is aligned with the widthwise direction of the mounting groove 90, the intermediate points $P_1$ of end portions of the fixing piece 160 abut the inclined surfaces 96. As a result, the fixing piece 160 cannot be removed from the mounting groove 90.

On the other hand, as shown in FIGS. 13 and 14, the leg 154 is provided with a torsion spring 184. The torsion spring 184 is disposed around the supporting shaft 162. One end of the torsion spring 182 is anchored to the fixing piece 160 and the other end thereof is anchored to the base plate 152 of the supporting member 148. Thus, the fixing piece 160 is urged about the supporting shaft 162 in the direction of arrow E.

Anchoring means, such as a projection which anchors the handle plate 168 against the urging force of the torsion spring 184 such that the widthwise direction of the fixing piece 160 extends along the widthwise direction of the mounting groove 90, is formed at the recess portion 146 of the clamp 140. In the back end chuck 74, if anchoring of the handle plate 168 by the anchoring means is released with the fixing piece 160 being inserted into the mounting groove 90, the fixing piece 160 is rotated with the handle plate 168 by the urging force of the torsion spring 184 in the direction of arrow E. Therefore, the longitudinal direction end portions of the fixing piece 160 abut the inclined surfaces 96 of the mounting groove 90.

Further, in the back end chuck 74, if the handle plate 168 is rotated against the urging force of the torsion spring 184 to be anchored to the anchoring means (not shown), the fixing piece 160 can be removed from the mounting groove 90, i.e., the fixing piece 160 can be removed from the rotating drum 54. Any structure may be used as the back end chuck mounting/dismounting unit 68 which mounts the back end chuck 74 to the rotating drum 54 and dismounts it therefrom.

Movements of the back end chuck 74 when mounted to and dismounted from the rotating drum 54 will be described.

If the handle plate 168 is anchored to a predetermined position on the recess portion 146 of the clamp 140, the back end chuck 74 is held with the fixing piece 160 of the leg opposing the mounting groove 90 of the rotating drum 54 and the widthwise direction of the fixing piece 160 being aligned with the widthwise direction of the mounting groove 90 against the urging force of the torsion spring 184.

Figures 17A, 17B, 17C, 17D, 17E, 17F:
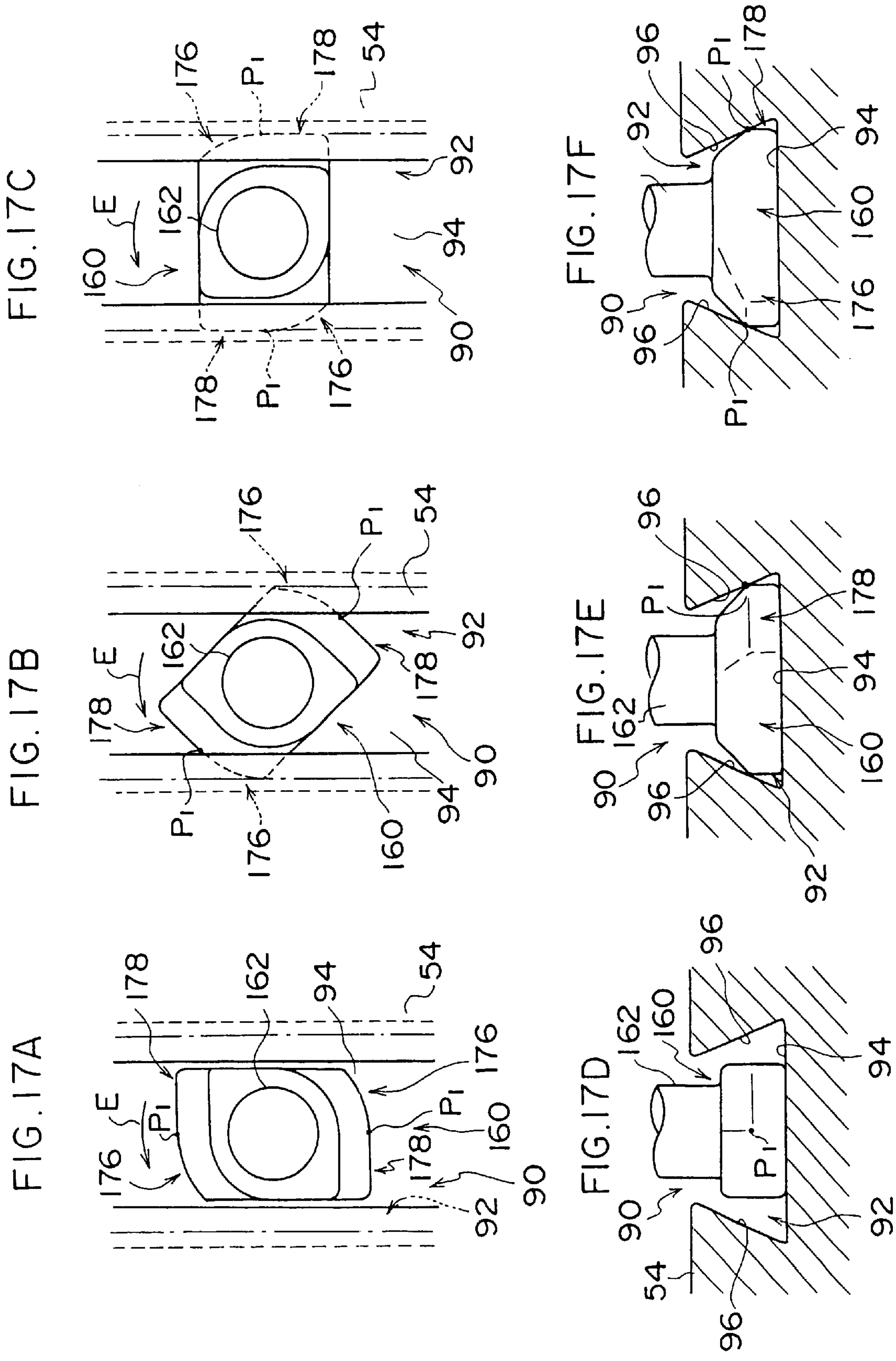
FIGS. 17A through 17F are views showing rotation of the fixing piece in the mounting groove.

In the back end chuck mounting/dismounting unit 68, when rotation of the rotating drum 54 temporarily stops at a position in which the back end of the print plate 12 wrapped around the rotating drum 54 opposes the back end chuck 74, the back end chuck 74 is moved to the circumferential surface of the rotating drum 54. Thereby the clamp portion 142 of the back end chuck 74 abuts the back end of the print plate 12. Further, as shown in FIGS. 17A and 17D, the fixing piece 160 of the leg 154 is inserted into the mounting groove 90 formed at the circumferential surface of the rotating drum 54.

At this time, the plate spring 174 provided at the back end chuck 74 abuts the circumferential surface of the rotating drum 54 so as to be resiliently deformed. By inserting the fixing piece 160 into the mounting groove 90 against the urging force generated by resilient deformation of the plate spring 174, an urging force which nips the print plate 12 between the clamp portion 142 and the rotating drum 54 is applied.

When the fixing piece 160 is inserted into the mounting groove 90 of the rotating drum 54, anchoring of the handle plate 168 by the anchoring means (not shown) is released by, for example, the handle plate 168 being rotated in the direction of arrow E.

In this way, the fixing piece 160 inserted into the mounting groove 90 is rotated in the direction of arrow E within the enlarged width portion 92 of the mounting groove 90 by the urging force of the torsion spring 184. The fixing piece 160 is rotated in the direction of arrow E from the state in which the widthwise direction thereof aligns with the widthwise direction of the width of the mounting groove 90. At first, as shown in FIGS. 17B and 17E, the circular arc shaped portion 176 side of the fixing piece 160 approaches the inclined surfaces 96 within the enlarged width portion 92. At this time, since the longitudinal direction end portions of the fixing piece 160 are spaced from the inclined surfaces 96 of the enlarged width portion 92, the fixing piece 160 is further rotated in the direction of arrow E by the urging force of the torsion spring 184.

As shown in FIGS. 17C and 17F, the fixing piece 160 is rotated up to about 90° by the urging force of the torsion spring 184 from a state in which the fixing piece 160 is inserted into the mounting groove 90, and its longitudinal end portions (intermediate points $P_1$) abut the inclined surfaces 96 of the enlarged width portion 92. At this time, corner portions, which are formed at the fixing piece 160 and which are formed by the linear portion 178 and the inclined portion 180, abut the inclined surfaces 96 of the enlarged width portion 92, thus rotation of the fixing piece 160 by the urging force of the torsion spring 184 stops.

That is, the circular arc shaped portions 176 are formed at the longitudinal direction end portions, and therefore the fixing piece 160 is rotated by the urging force of the torsion spring 184 in the direction of arrow E until the intermediate points $P_1$ abut the inclined surface 96 of the enlarged width portion 92. If the longitudinal direction end portions of the fixing piece 160 (intermediate points $P_1$) abut the inclined surfaces 96, because portions of the fixing piece 160 opposite the direction of arrow E with respect to the intermediate point $P_1$ (point $P_3$ side) are spaced from the center Q, the fixing piece 160 cannot be rotated more than 90° is held by the urging force of the torsion spring 184.

In this way, the back end chuck 74 with which the fixing piece 160 is provided can be attached to the rotating drum 54 together with the fixing piece 160 without using a mechanism for accurately rotating the fixing piece 160. Since the fixing piece 160 is urged in the direction of arrow E by the urging force of the torsion spring 184, it cannot be removed from the mounting groove 90.

The fixing piece 160 which is attached to the rotating drum 54 is urged in a direction in which the fixing piece 160 is removed from the mounting groove 90 by the urging force of the plate spring 174 and the centrifugal force of the rotating drum 54 when the rotating drum 54 rotates.

At this time, since the longitudinal direction end portions of the fixing piece 160 abut the inclined surfaces 96, the fixing piece 160 cannot be removed from the mounting groove 90 and is securely held. In the fixing piece 160, the inclined surface 182 at the circular arc shaped portion 176 side is formed in a circular arc with its center being the supporting shaft 162, and therefore even if the urging force of the torsion spring 184 does not appropriately act on the fixing piece 160 and the fixing piece 160 cannot rotate up to about 90°, when the circular arc shaped portion 176 opposes the inclined surface 96 of the mounting groove 90, it is possible to ensure that the fixing piece 160 is prevented from being removed from the mounting groove 90.

On the other hand, the fixing piece 160 abuts the inclined surfaces 96 such that the rotating drum 54 receives the urging force and the centrifugal force that the inclined surfaces 96 exert on the fixing piece 160. At this time, the inclined surface 96 is inclined at a predetermined angle θ in a range from at least 45° to less than 90° with respect to the bottom surface 94 of the mounting groove 90. As a result, the thickness of the mounting groove 90 at a position at which it abuts the fixing piece 160 can be made relatively thick.

Figure 19:
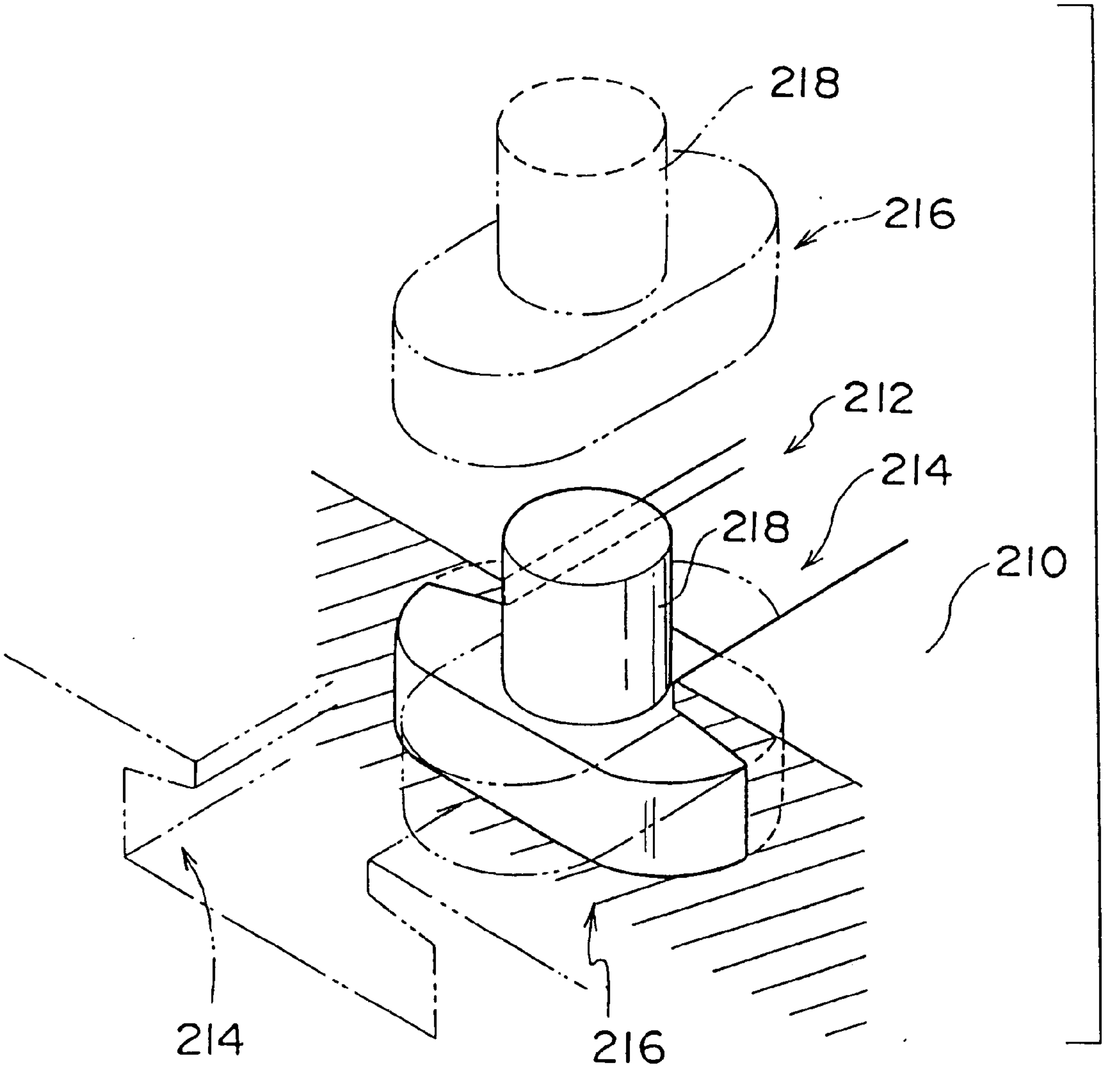
FIG. 19 is a perspective view of main portions of a conventional fixing piece and a conventional groove of a rotating drum.

That is, as shown in FIG. 19, the cross-section of the opening of the enlarged width portion 214 is conventionally formed in a substantially rectangular configuration, thus the thickness of the peripheral edge of the opening is thin, and this thin portion receives a force from the fixing piece 216. In order to make the portion thick, the groove 212 needs to be made deep. Accordingly, the thickness of the outer circumferential portion of the rotating drum 210 needs to be made thick.

In contrast, in the mounting groove 90 of the rotating drum 54 used in the second embodiment, when the enlarged width portion 92 is formed, the inclined surfaces 96, which are inclined at a relatively large angle θ, are formed, thereby the mounting groove 90 can receive a force from the fixing piece 160 at a position whose thickness is relatively thick. Thus, the outer circumferential portion of the rotating drum 54 needs not be made thick in order to strengthen the peripheral edge portion of the mounting groove 90.

Because the thickness of the rotating drum 54 can be made relatively thin, a mechanism for supporting the rotating drum 54 can be made simple and light. As the inertial force of the rotating drum 54 is small, a driving force for driving the rotating drum 54 and a braking force can be relatively small.

On the other hand, the angle θ of the inclined surface 96 is from at least 45° to less than 90°. Thus a force that the inclined surfaces 96 receive from the fixing piece 160 in the widthwise direction of the groove becomes large. A force, in a direction in which the circumferential surface portion of the mounting groove 90 is rolled up, can be made small. In this way, it is possible to avoid deformation of the mounting groove 90 by the fixing piece 160 without making the thickness of the rotating drum 54 thick.

Because the mounting groove 90 is formed in a simple shape such that its cross-section is a substantially trapezoidal configuration, a process for forming the mounting groove 90 at the rotating drum 54 is easy.

In this way, in the second embodiment, by providing the inclined surfaces 96 which are inclined at a predetermined angle θ at the time of forming the mounting groove 90, it is possible to avoid deformation of the peripheral edge of the opening of the mounting groove 90 without making the thickness of the rotating drum 54 thick. Further, it is possible to avoid the mounting failure of the print plate 12, such as the print plate 12 coming up off the drum, caused by the deformation of the peripheral edge of the opening.

In the second embodiment, since the circular arc shaped portion 176 is formed at only one widthwise direction end side of the fixing piece 160, the fixing piece 160 can be rotated to a predetermined direction by a simple mechanism.

The second embodiment described above is shown as an example of the present invention and does not limit the structure of the present invention. In the second embodiment, the cross-section of the mounting groove 90 is formed in a trapezoidal configuration, but the present invention is not limited to the trapezoidal configuration. Any configuration may be used so long as the inclined surface is formed so as to be inclined at a predetermined angle θ which is in a range from at least 45° to less than 90°.

Figure 18A:
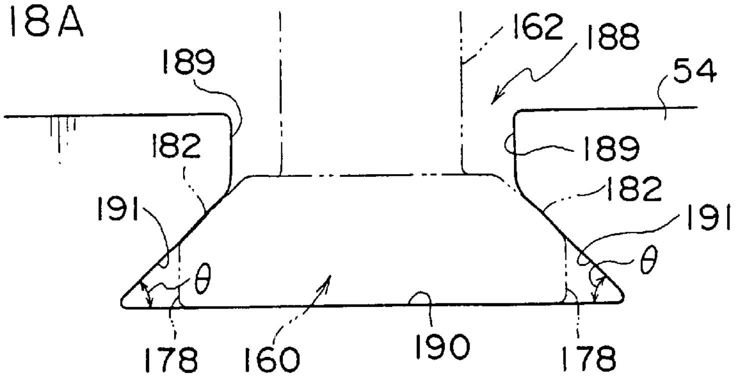
FIG. 18A is a view of a modified example of the mounting groove for mounting the fixing piece, seen from the direction of groove.

For example, like a mounting groove 188 shown in FIG. 18A, the mounting groove may be formed such that standing walls 189 are formed at the opening side thereof, a width of an opening is constant to a predetermined depth and inclined surfaces 191 which are inclined at a predetermined angle θ are formed at a bottom surface 190 side of the rotating drum 54.

Figure 18B:
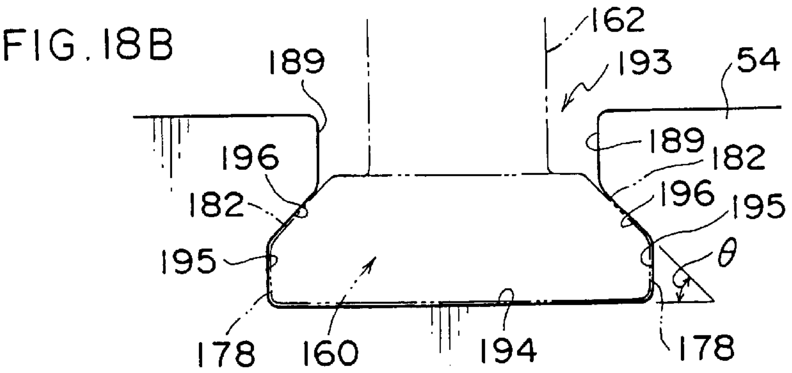
FIG. 18B is a view showing another modified example of the mounting groove.

Like a mounting groove 193 shown in FIG. 18B, the mounting groove may be formed such that standing walls 195 are provided at the bottom surface 194 side and inclined surfaces 196 which are inclined at a predetermined angle θ are formed at the rotating drum 54 between the standing walls 189 and 195. In this case, a structure in which the longitudinal end surfaces of the fixing piece 160 (linear portions 178) abut the standing walls 195 at the bottom surface 194 side is preferable.

Figure 18C:
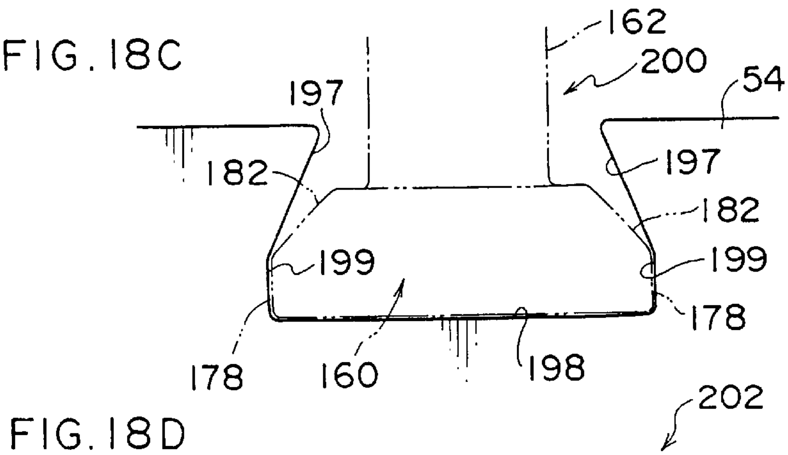
FIG. 18C is a view showing yet another modified example of the mounting groove.

Although in the second embodiment, upper ends of the linear portions 178 of the fixing piece 160 abut the inclined surfaces 96 of the mounting groove 90, the present invention is not limited to this case. It least suffices for one portion of the fixing piece 160 to abut the inclined surface formed within the mounting groove. That is, as shown in FIG. 18C, a mounting groove 200, in which each standing wall 199 is provided at a bottom surface 198 side of the inclined surface 197, may be formed at the rotating drum 54 and each upper end of the linear portions 178 of the fixing piece 160 inserted into the mounting groove 200 may abut an end portion of the inclined surface 197 at the standing wall 199 side or at a bent portion between the inclined surface 197 and the standing wall 199.

Further, as shown in FIGS. 18A and 18B, the inclined surfaces 182 may abut the inclined surfaces 191 and 196 of the mounting grooves 188 and 193.

Figure 18D:
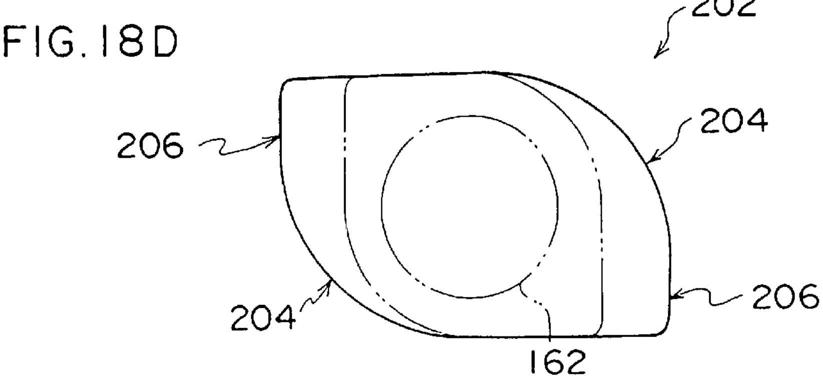
FIG. 18D is a bottom view of a modified example of the mounting groove.

In the second embodiment, the circular arc shaped portion 176 is formed from the widthwise direction intermediate point of the fixing piece 160 to one widthwise direction end side thereof. For example, as shown in FIG. 18D, a fixing piece 202 in which a circular arc shaped portion 204 which is curved in a circular arc from the other widthwise direction end side of the fixing piece to the one widthwise direction end side thereof is formed and an area of a linear portion 206 is narrower than the circular arc shaped portion 204 suffices. Any fixing piece will suffice so long as the circular arc shaped portion is formed at least at only one widthwise direction end side thereof. It is preferable that a linear portion, even if it is short, is formed at its shortest at the other widthwise direction end side thereof so as to be adjacent to the circular arc shaped portion.

The present invention has been described by taking an image exposure device which exposes a print plate as an example. The present invention may be used in various types of exposure devices which expose photosensitive materials including not only the print plate but also a photographic film, a printing paper and the like. The present invention may be used in any device in which a fixed member such as a back end chuck or the like is fixed to a fixing member such as a rotating drum or the like at an arbitrary position.

The present invention may be used for a fixing member which is formed in any shape such as a cylindrical shape, a columnar shape a plate shape, and the like and a member to be fixed such as a back end chuck whose shape corresponds to that of the fixing member.

What is claimed is:

1. A chuck for detachably fixing an object to a rotatable base, said chuck comprising:

(a) a clamp having opposite ends;

(b) a resilient member connected to one end of the clamp; and (c) a support detachably mounted to the rotatable base at the other end of the clamp;

wherein the clamp is pivotally mounted to the support;

wherein the resilient member is resiliently deformed when the support is mounted to the rotatable base;

wherein the resilient member is configured to apply a force to said one end of the clamp, thereby causing the other end of the clamp to pivot downward to apply a pressing force against the object, which is disposed between the rotatable base and said other end of the clamp; and wherein, when the rotatable base rotates, a centrifugal force acts on the clamp and increases the pressing force against the object.

2. The chuck of claim 1, wherein the clamp includes a center of gravity located between the ends of the clamp, and the support supports the clamp at a location nearer to said other end of the clamp with respect to the center of gravity.

3. The chuck of claim 1, wherein said pressing force is formed by a first component force which is in a direction opposite to the direction of the centrifugal force and a second component force perpendicular to the first component force.

4. The chuck of claim 3, wherein said first component force acts so as to press the object against the base, and said second component force acts so as to slide the object with respect to the base.

5. The chuck of claim 4, wherein said other end of the clamp is rounded.

6. The chuck of claim 1, wherein said base is a cylindrical drum and said object is a flexible sheet member which wraps around an outer surface of the drum, and said other end of the clamp presses the sheet member against the outer surface of the drum when the sheet member is disposed between said the other end and the base.

7. The chuck of claim 6, wherein said pressing force is formed by a first component force which acts in a radially inward direction relative to the drum and a second component force which acts in a tangential direction relative to the drum, said first component force acts so as to fix the sheet material to the outer surface of the drum and said second component force acts so as to tension the sheet material.

8. The chuck of claim 7, wherein said other end of the clamp is rounded.

9. The chuck of claim 6, wherein said sheet member includes a peripheral edge, which said other end of the clamp fixes to the base when said sheet member is disposed between said base and said other end of the clamp.

10. The chuck of claim 6, wherein the base includes a dovetail type groove having a bottom and a top, formed along the base and whose cross-section is such that the groove top has a width less than a width of the groove bottom, and said support is detachably mountable to the drum via said groove.

11. The chuck of claim 6, wherein the base includes a dovetail type groove having a bottom and a top, formed along the base and whose cross-section is such that the groove top has a width less than a width of the groove bottom, and said support is ordinarily mounted so as to be movable along the outer surface of the drum such that the sheet member may be fixed to the drum at any position along the circumferential direction of the drum.

12. A fixing structure for detachable mounting, comprising:

a base having a dovetail type groove including a bottom and a top, formed along the base and whose cross-section is a substantially trapezoidal such that the groove top has a width less than a width of the groove bottom; and an object having an end with a block integrally provided at said end of the object and said block being insertable into said groove;

wherein the object is rotatable with the block about an axis of the object, and the block is structured such that when the object is positioned at a first rotation angle position around the axis of the object, the block can be inserted into the groove and when the block is rotated from the first rotation angle position to a second rotation angle position, the block engages with the groove and thus further rotation of the block is prevented and the block cannot be removed from the groove at the second rotation angle position.

13. The fixing structure of claim 12, wherein said block is elongated.

14. The fixing structure of claim 13, wherein said block has a length and a width and the block width is less than the groove top width, and the block length is greater than the groove top width.

15. The fixing structure of claim 14, wherein said block includes a longitudinal end having a rounded corner portion for facilitating rotation of the block in the groove.

16. The fixing structure of claim 14, wherein the block includes longitudinal end portions and the groove includes inclined walls and when said block is rotated in the groove to the second rotation angle position, the longitudinal direction end portions of said block surface-engage the inclined walls of the groove, thus detachably mounting the object to the base.

17. The fixing structure of claim 16, wherein inclined surface portions are formed at the longitudinal direction end portions of said block and surface-engage with corresponding inclined walls of the groove in the second rotation angle position.

18. The fixing structure of claim 12 further comprising a resilient member mounted to said block in a resiliently deformed state so as to urge the block to rotate to the second rotation angle position.

19. The fixing structure of claim 12, wherein said base is a cylindrical drum and said object is a support.

20. The fixing structure of claim 19 further comprising a chuck for detachably fixing sheet material to an outer surface of the drum said chuck comprising: a clamp having opposite ends swingably supported by the support between said ends; and a spring member for applying an urging force to one end of the clamp, thereby causing the other end to apply a pressure force against sheet material when it is disposed between said other end and the drum.

21. The fixing structure of claim 20, wherein said clamp includes a center of gravity and the support supports the clamp at a location nearer to said other end than said one end and said other end of the clamp presses the sheet material against the drum due to said urging force and, when the drum rotates, a centrifugal force acts on the clamp and the centrifugal force increases a clamp pressing force against the sheet material.

* * * * *